(12) United States Patent
Jung et al.

(10) Patent No.: US 11,800,250 B2
(45) Date of Patent: Oct. 24, 2023

(54) IMAGE SENSOR AND OPERATION METHOD OF THE IMAGE SENSOR

(71) Applicant: Samsung Electronics Co., Ltd., Suwon-si (KR)

(72) Inventors: Yooseung Jung, Suwon-si (KR); Seokyong Hong, Suwon-si (KR); Junyoung Kil, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/978,568

(22) Filed: Nov. 1, 2022

(65) Prior Publication Data
US 2023/0156360 A1    May 18, 2023

(30) Foreign Application Priority Data

Nov. 12, 2021  (KR) .................. 10-2021-0156062
Jun. 30, 2022  (KR) .................. 10-2022-0080710

(51) Int. Cl.
*H04N 25/704* (2023.01)
*H04N 23/76* (2023.01)
(Continued)

(52) U.S. Cl.
CPC ........... *H04N 25/704* (2023.01); *H04N 23/67* (2023.01); *H04N 23/73* (2023.01); *H04N 23/76* (2023.01)

(58) Field of Classification Search
CPC ...... H04N 25/704; H04N 23/67; H04N 23/73; H04N 23/76; H04N 25/135; H04N 25/59; H04N 25/7795; H04N 25/133
See application file for complete search history.

(56) References Cited

U.S. PATENT DOCUMENTS 7,999,870 B2   8/2011  Compton et al.
10,306,191 B2  5/2019  Komori et al.
(Continued)

FOREIGN PATENT DOCUMENTS

CN       113038042 A    6/2021
KR    10-2020-0108953 A    9/2020

OTHER PUBLICATIONS

Extended European Search Report dated Feb. 24, 2023 for corresponding European Application No. 22206189.7.

*Primary Examiner* — Shahbaz Nazrul
(74) *Attorney, Agent, or Firm* — Harness, Dickey & Pierce, P.L.C.

(57) ABSTRACT

Provided is an image sensor and an operation method of the image sensor. The image sensor includes a pixel array including a plurality of white pixels, a plurality of color pixels, and a plurality of auto focus (AF) pixels, a first shared pixel including the plurality of white pixels and the plurality of color pixels includes a first conversion gain transistor and a second conversion gain transistor configured to control a conversion gain of the first shared pixel, and a second shared pixel including some of the plurality of white pixels and the plurality of color pixels and at least one AF pixel includes a third conversion gain transistor and a fourth conversion gain transistor configured to control a conversion gain of the second shared pixel. The first conversion gain transistor, the second conversion gain transistor, the third conversion gain transistor, and the fourth conversion gain transistor are connected to different conversion gain control lines, respectively.

20 Claims, 13 Drawing Sheets

(51) Int. Cl.
  *H04N 23/67* (2023.01)
  *H04N 23/73* (2023.01)

(56) References Cited

U.S. PATENT DOCUMENTS

| | | |
|---|---|---|
| 10,798,322 B2 | 10/2020 | Smith et al. |
| 10,917,592 B2 | 2/2021 | Shim et al. |
| 11,089,242 B2 | 8/2021 | Min et al. |
| 11,418,734 B1 | 8/2022 | Wang et al. |
| 2013/0113966 A1 | 5/2013 | Arishima et al. |
| 2014/0184863 A1* | 7/2014 | Tu .......................... H04N 23/12 348/280 |
| 2018/0063456 A1* | 3/2018 | Lee ........................ H04N 25/76 |
| 2019/0222785 A1 | 7/2019 | Lee |
| 2020/0137325 A1 | 4/2020 | Mori et al. |
| 2021/0067703 A1 | 3/2021 | Kadambala et al. |
| 2021/0175269 A1* | 6/2021 | Fujita .................... H04N 25/709 |
| 2021/0344882 A1* | 11/2021 | Park ..................... H04N 25/702 |
| 2022/0303509 A1* | 9/2022 | Pyo ..................... H04N 25/133 |

* cited by examiner

FIG. 2A

IMAGE SENSOR AND OPERATION METHOD OF THE IMAGE SENSOR

CROSS-REFERENCE TO RELATED APPLICATIONS

This application is based on and claims priority under 35 U.S.C. § 119 to Korean Patent Application No. 10-2021-0156062, filed on Nov. 12, 2021 in the Korean Intellectual Property Office, and Korean Patent Application No. 10-2022-0080710, filed on Jun. 30, 2022 in the Korean Intellectual Property Office, the disclosures of each of which are incorporated by reference herein in their entireties.

BACKGROUND

The inventive concepts relate to image sensors and operation methods of image sensors.

Image sensors that capture an image and convert the captured image into an electrical signal are also used in cameras mounted on vehicles, security devices, and robots in addition to electronic devices for general consumers, such as digital cameras, cameras for mobile phones, and portable camcorders. Such an image sensor includes a pixel array, and each of pixels included in the pixel array may include an optical sensing element. The optical sensing element may generate an electrical signal according to the intensity of absorbed light.

In order to increase the resolution of the image sensor, the size of the pixel is continuously decreased, and even if the size of the pixel is decreased, technology for maintaining or increasing the image quality of an image is required. A dynamic range may affect the image quality of the image sensor, and when a high dynamic range (HDR) is provided, bright regions and dark regions of the image may be expressed in detail.

The dynamic range of the image that is a range in which the brightness of the image from dark portions to bright portions may be expressed, may be defined as the ratio of the brightest pixel value with respect to the darkest pixel value. A process of controlling the dynamic range is performed by adjusting a pixel value indicating brightness such as the brightness of the image. Technology for enhancing the image quality by improving the dynamic range of the image is referred to as an HDR method. In the image sensor, an HDR is required to be secured in terms of image quality improvement.

SUMMARY

Some example embodiments of the inventive concepts provide the structure of a pixel array in which a high dynamic range (HDR) of a pixel array including red, green, blue, and white (RGBW) pixels may be increased, and an operation method of the pixel array.

According to some example embodiments of the inventive concepts, there is provided an image sensor.

The image sensor may include a pixel array including a plurality of white pixels, a plurality of color pixels, and a plurality of auto focus (AF) pixels, and a row driver configured to generate signals applied to the pixel array, wherein each of the plurality of white pixels, the plurality of color pixels, and the plurality of AF pixels of the pixel array includes a photodiode and a transfer transistor serially connected to the photodiode, and a first shared pixel including the plurality of white pixels and the plurality of color pixels include a first conversion gain transistor and a second conversion gain transistor each configured to control a conversion gain of the first shared pixel, and a second shared pixel including some of the plurality of white pixels and the plurality of color pixels and some of the plurality of AF pixels includes a third conversion gain transistor and a fourth conversion gain transistor each configured to control a conversion gain of the second shared pixel, and a white pixel control line is connected to a gate of the transfer transistor included in each of the plurality of white pixels, and a color pixel control line is connected to a gate of the transfer transistor included in each of the plurality of color pixels, and an AF pixel control line is connected to a gate of the transfer transistor included in each of the plurality of AF pixels, and the first conversion gain transistor, the second conversion gain transistor, the third conversion gain transistor, and the fourth conversion gain transistor are connected to different conversion gain control lines, respectively.

According to some example embodiments of the inventive concepts, there is provided an image sensor.

The image sensor may include a pixel array including a plurality of white pixels, a plurality of color pixels, and a plurality of AF pixels, wherein the pixel array includes a first shared pixel including a first two white pixels of the plurality of white pixels and a first two color pixels of the plurality of color pixels, a second shared pixel including a second two white pixels of the plurality of white pixels, a first auto focus X (AFX) pixel, and a first AF pixel, and a third shared pixel including a second two color pixels of the plurality of color pixels, a second AFX pixel, and a second AF pixel, wherein a gate of a transfer transistor serially connected to a photodiode corresponding to white pixels included in the first shared pixel and the second shared pixel is connected to a white pixel control line, and a gate of the transfer transistor serially connected to a photodiode corresponding to color pixels included in the first shared pixel, the second shared pixel, and the third shared pixel is connected to a color pixel control line, and a gate of a transfer transistor serially connected to a photodiode corresponding to sub-pixels included in the first AF pixel and the second AF pixel is connected to an AF pixel control line, and a gate of a transfer transistor serially connected to a photodiode corresponding to color pixels included in the first AFX pixel is connected to a first AFX pixel control line, and a gate of a transfer transistor serially connected to a photodiode corresponding to white pixels included in the second AFX pixel is connected to a second AFX pixel control line.

According to some example embodiments of the inventive concepts, there is provided an operation method of an image sensor including a plurality of sub-pixels, wherein the plurality of sub-pixels include a plurality of white pixels, a plurality of color pixels, and a plurality of AF pixels, and the image sensor further includes a timing controller configured to control timings of signals applied to the plurality of sub-pixels, the operation method including determining, by the timing controller, a first turn-on timing in a shutter section and a second turn-on timing in a readout section of each of signals applied to a white pixel control line connected to the plurality of white pixels, signals applied to a color pixel control line connected to the plurality of color pixels, and signals applied to an AF pixel control line connected to the plurality of AF pixels, and controlling, by the timing controller, a transition timing from a second level to a first level of signals applied to each of a first high conversion control line and a first low conversion control line for controlling a conversion gain of a first shared pixel that does not include some of the plurality of AF pixels and signals applied to each of a second high conversion control line and a second low conversion control line for controlling a conversion gain of a second shared pixel including some of the plurality of AF pixels.

BRIEF DESCRIPTION OF THE DRAWINGS

Example embodiments will be more clearly understood from the following detailed description taken in conjunction with the accompanying drawings in which:

FIGS. 2A and 2B are views illustrating a pixel array according to some example embodiments;

DETAILED DESCRIPTION

Figure 1:
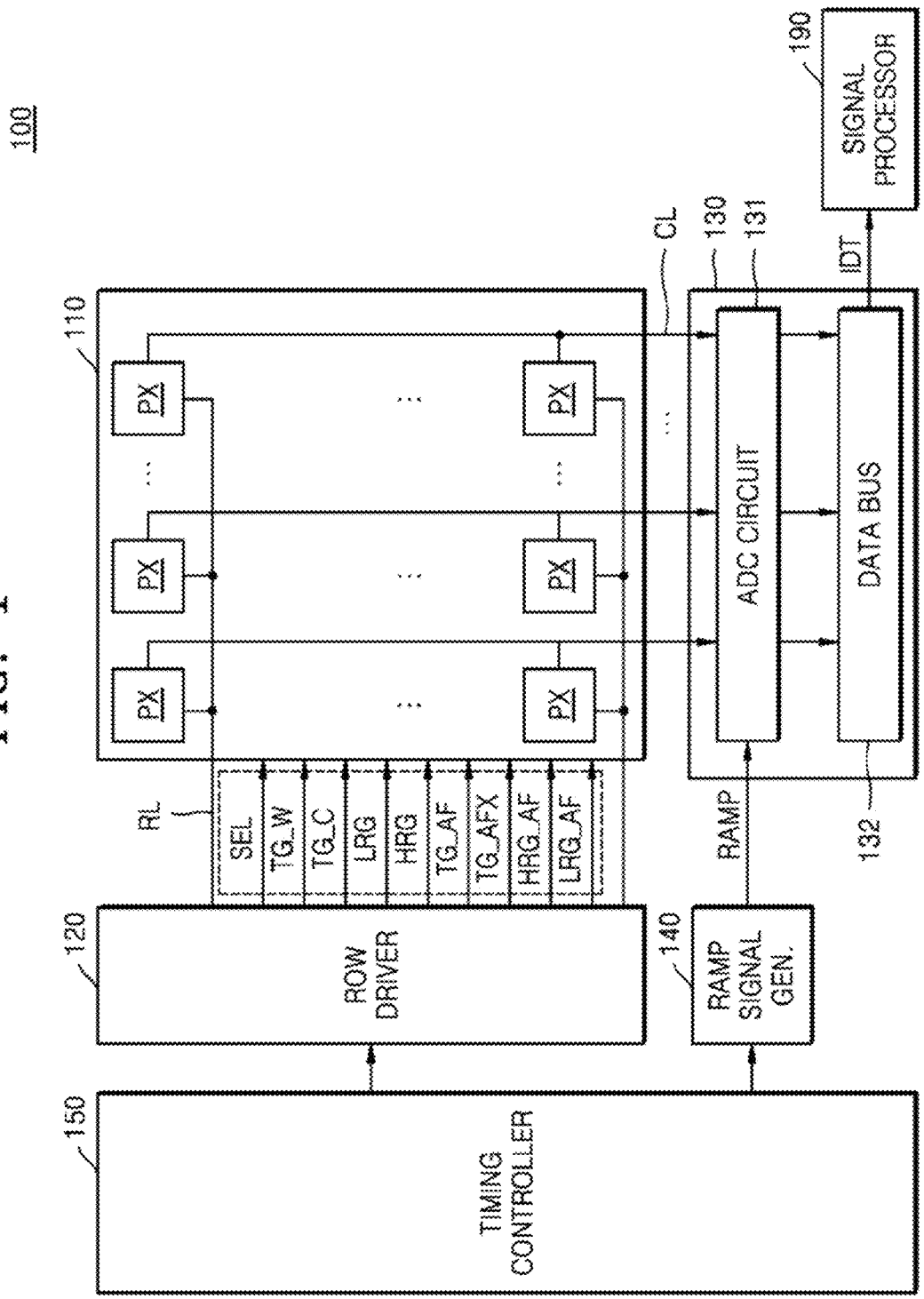
FIG. 1 is a block diagram illustrating an image sensor according to some example embodiments.

Hereinafter, some example embodiments of the inventive concepts will be described with reference to the accompanying drawings.

It will be understood that when an element is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about"

or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed "by" performing additional operations, it will be understood that the operation may be performed "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.).

FIG. 1 is a block diagram illustrating an image sensor according to some example embodiments.

An image sensor 100 may be mounted on an electronic device having an image or optical sensing function. For example, the image sensor 100 may be mounted on an electronic device, such as a camera, a smartphone, a wearable device, an Internet of Things (IoT) device, a home appliance, a tablet personal computer (PC), a personal digital assistant (PDA), a portable multimedia player (PMP), a navigation device, a drone, an advanced driver assistance system (ADAS), and the like. In addition, the image sensor 100 may be mounted on electronic devices provided as parts in vehicles, furniture, manufacturing facilities, doors, and various instruments.

Referring to FIG. 1, the image sensor 100 may include a pixel array 110, a row driver 120, a readout circuit 130, a ramp signal generator 140, a timing controller 150, and a signal processor 190, and the readout circuit 130 may include an analog-digital conversion (ADC) circuit 131, and a data bus 132.

The pixel array 110 may include a plurality of row lines RL, a plurality of column lines CL, and a plurality of pixels PX connected to the plurality of row lines RL and the plurality of column lines CL and arranged in a matrix. The plurality of pixels PX may be shared pixels. In some example embodiments, the plurality of pixels PX may be sub-pixels.

Each of the plurality of pixels PX may include at least one photoelectric conversion element. The pixel PX may sense light using the photoelectric conversion element and may output an image signal that is an electrical signal according to the sensed light. For example, the photoelectric conversion element may be an optical sensing element including an organic material or an inorganic material, such as an inorganic photodiode, an organic photodiode, a perovskite photodiode, a phototransistor, a photogate, or a pinned photodiode. In some example embodiments, each pixel PX may include a plurality of photoelectric conversion elements.

A microlens (not shown) for light condensing may be arranged above each pixel PX or above each of pixel groups including adjacent pixels PX. Each of the plurality of pixels PX may sense light in a particular spectrum range from light received through the microlens arranged above each pixel PX. For example, the pixel array 110 may include a red pixel R for converting light in a red spectrum range into an electrical signal, a green pixel G for light in a green spectrum range into an electrical signal, a blue pixel B for converting light in a blue spectrum range into an electrical signal, and a white pixel W for noise control. A color filter for transmitting light in a particular spectrum range may be arranged above each of the plurality of pixels PX. However, example embodiments are not limited thereto, and the pixel array 110 may include pixels for converting light in other spectrum ranges than red, green, and blue into an electrical signal. According to some example embodiments, each of the pixels PX of the pixel array 110 may be RGBW pixels.

In some example embodiments, the pixel PX may have a multi-layer structure. The pixel PX having a multi-layer structure may include a plurality of stacked photoelectric conversion elements for converting light in different spectrum ranges into an electrical signal, and electrical signals respectively corresponding to different colors may be generated from the plurality of photoelectric conversion elements. In other words, electrical signals respectively corresponding to a plurality of colors in one pixel PX may be output.

A color filter array for transmitting light in a particular spectrum range may be arranged above the plurality of pixels PX, and color that may be sensed by the pixel PX may be determined according to the color filter arranged above each pixel PX. However, example embodiments are not limited thereto. In some example embodiments, in the case of a particular photoelectric conversion element, light in a particular wavelength band may be converted into an electrical signal according to the level of an electrical signal applied to the photoelectric conversion element.

In each pixel PX, electric charges generated by the photoelectric conversion element, such as a photodiode, may be accumulated on a floating diffusion node, and the electric charges accumulated on the floating diffusion node may be converted into voltages. In this case, the ratio of converting the electric charges accumulated on the floating diffusion node into voltages may be referred to as a conversion gain. The conversion gain may vary depending on the capacitance of the floating diffusion node.

In detail, when the capacitance of the floating diffusion node increases, the conversion gain may be reduced, and when the capacitance of the floating diffusion node decreases, the conversion gain may be increased. The ratio of converting the electric charges into voltages may be the highest in a high conversion gain mode in which the capacitance of the floating diffusion node is low, and may be the lowest in a low conversion gain mode in which the capacitance of the floating diffusion node is high.

In some example embodiments, each pixel PX may operate in a single exposure method for performing one exposure. For example, the pixel PX may operate in a single exposure method, whereby pixel signals are generated through a photodiode after one exposure operation.

The row driver 120 may drive the pixel array 110 in units of a row line RL. The row driver 120 may select at least one row line RL from among row lines RL that constitute the pixel array 110. For example, the row driver 120 may generate a selection signal SEL for selecting one of the plurality of row lines RL. The pixel array 110 may output a pixel signal from the row line RL selected by the selection signal SEL. The pixel signal may include a reset signal and an image signal.

The row driver 120 may generate control signals for controlling the pixel array 110. For example, the row driver 120 may generate a white pixel control line signal TG_W, a color pixel control line signal TG_C, an auto focus (AF) pixel control line signal TG_AF, an auto focus X (AFX) pixel control line signal TG_AFX, and a plurality of conversion gain control line signals HRG, LRG, HRG_AF, and LRG_AF. The row driver 120 may provide each of signals to the plurality of control lines independently. In the description, the signal and the control line to which the signal is provided can be represented with the same reference numeral (for example, the white pixel control line signal TG_W and the white pixel control line TG_W). The row driver 120 may provide control signals to the plurality of pixels PX, in response to a timing control signal provided by the timing controller 150.

The timing controller 150 may control timings of the row driver 120, the readout circuit 130, and the ramp signal generator 140. Control signals for controlling an operation timing for each of the row driver 120, the readout circuit 130, and the ramp signal generator 140 may be provided from the timing controller 150. The timing controller 150 may control timings of the plurality of control line signals generated by the row driver 120, thereby determining activation and deactivation timings of signals applied to control lines. A detailed timing controlling method using the timing controller 150 is described below with reference to FIGS. 8 through 10.

The ramp signal generator 140 may generate a ramp signal RAMP that increases or decreases with a certain slope, and may provide the ramp signal RAMP to the ADC circuit 131 of the readout circuit 130.

The readout circuit 130 may read out a pixel signal from the pixels PX of the row line RL selected by the row driver 120 from among the plurality of pixels PX. The readout circuit 130 may convert pixel signals received from the pixel array 110 through a plurality of column lines CL into digital data, based on the ramp signal RAMP provided from the ramp signal generator 140, thereby generating and outputting pixel values respectively corresponding to the plurality of pixels PX in the unit of rows.

The ADC circuit 131 may compare pixel signals received through each column line CL with the ramp signal RAMP, respectively, and may generate pixel values that respectively are digital signals, based on comparison results. For example, a reset signal may be removed from the image signal, and pixel values indicating the amount of light sensed in the pixels PX may be generated. The ADC circuit 131 may sample and hold the pixel signal according to a correlated double sampling (CDS) method, and may perform double sampling on the level (for example, a reset signal) of specific noise and a level according to an image signal, and may generate comparison signals based on a level corresponding to a difference between the levels. The ADC circuit 131 may sample the pixel signal provided by reading-out the reset signal after reading-out the image signal first according to a delta reset sampling (DRS) method.

A plurality of pixel values generated by the ADC circuit 131 may be output as image data IDT through the data bus 132. The image data IDT may be provided to an image signal processor inside or outside the image sensor 100.

The data bus 132 may store a pixel value output from the ADC circuit 131 temporarily and then may output the pixel value. The data bus 132 may include a plurality of column memories and a column decoder. A plurality of pixel values stored in the plurality of column memories may be output as image data IDT under control by the column decoder.

The signal processor 190 may perform noise reduction processing, gain adjustment, waveform shaping, interpolation, white balance processing, gamma processing, edge emphasis, and binning on the image data. In some example embodiments, the signal processor 190 may generate an output image by synthesizing a plurality of pieces of image data output by the pixel array 110. On the other hand, in some example embodiments, the signal processor 190 may also be provided at a processor outside the image sensor 100.

The image sensor 100 according to the inventive concepts may perform control in a separate control line according to characteristics of sub-pixels of each of the plurality of shared pixels PX of the pixel array 110. The image sensor 100 according to the inventive concepts may control an operation timing of a white pixel included in the shared pixels PX and an operation timing of a color pixel included in the shared pixels PX separately through a plurality of control lines. According to some example embodiments, the white pixel of the pixel array 110 may generate a detail and noise. The color pixel of the pixel array 110 may generate color data. Pixels having an RGBW pattern of the pixel array 110 may achieve a signal to noise ratio (SNR) gain using the high sensitivity of light of the white pixel. By using this, in low light, only color information is applied to data that has passed through the white pixel W, and in high light, HDR may be increased by using data that has passed through the color pixels R, G, and B. When effective integration time (EIT) of the white pixel W is increased, the low light performance of the white pixel W may be increased so that HDR may be increased. According to the inventive concepts, EIT may be a time at which a photodiode receives an optical signal. The image sensor 100 may control the EIT of the white pixel and the EIT of the color pixel, respectively, through control of the operation timing. The image sensor 100 may increase HDR by controlling a conversion gain at the operation timings of the white pixel and the color pixel. According to some example embodiments, the image sensor 100 may operate in a high conversion gain mode at the operation timing of the white pixel so that the capacity of the white pixel may be quickly filled. Thus, read noise may be reduced so that SNR may be increased, which causes an increase in HDR.

As described herein, any devices, systems, modules, units, controllers, circuits, and/or portions thereof according to any of the example embodiments (including, without limitation, image sensor 100, pixel array 110, row driver 120, readout circuit 130, ADC circuit 131, data bus 132, ramp signal generator 140, timing controller 150, signal processor 190, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, units, controllers, circuits, and/or portions thereof according to any of the example embodiments, and/or any portions thereof, including any of the methods according to any of the example embodiments.

Figure 2A:
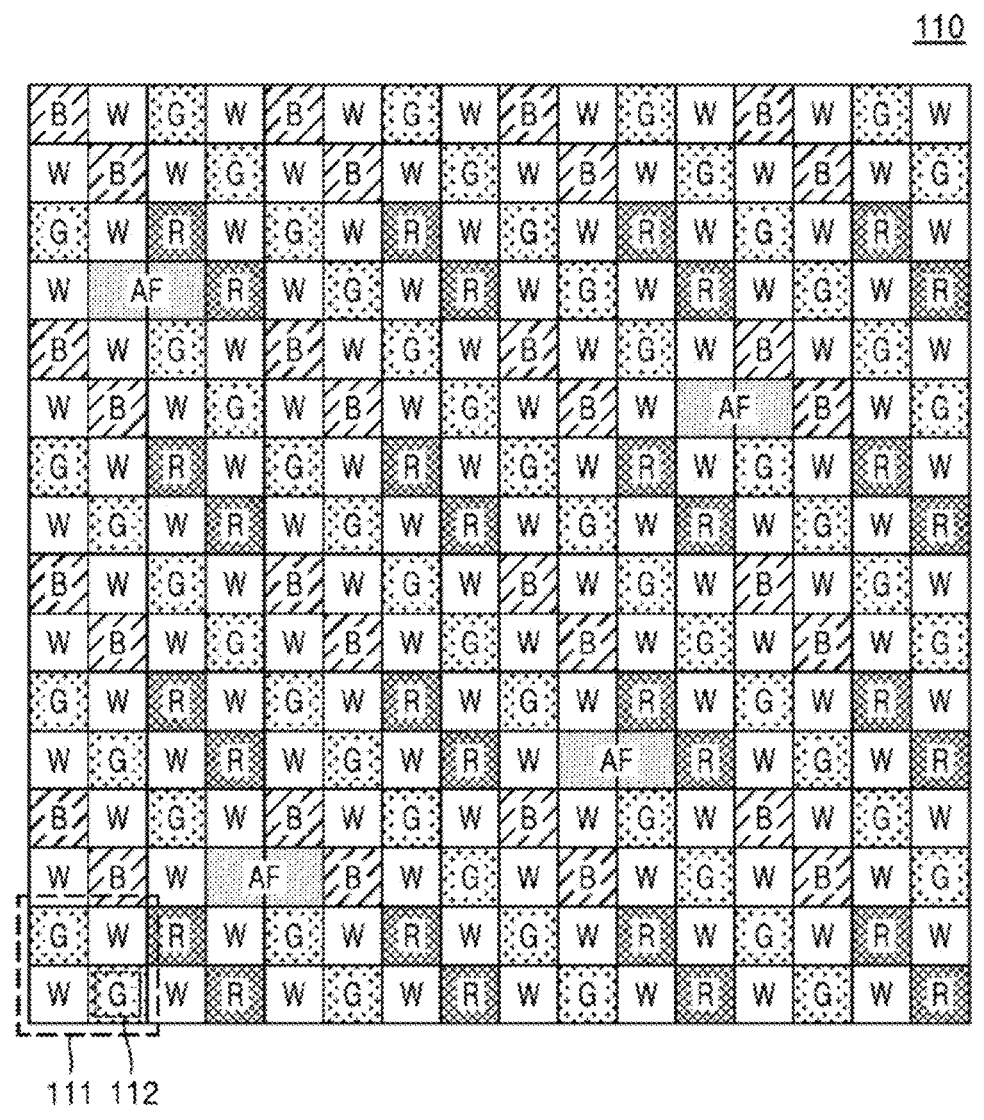
Figure 2B:
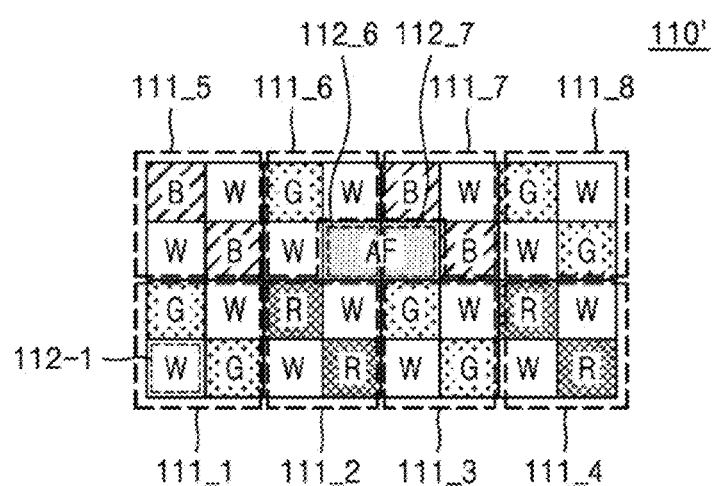

FIGS. 2A and 2B are views illustrating a pixel array according to some example embodiments.

Referring to FIG. 2A, the pixel array 110 may include a plurality of sub-pixels 112 arranged according to a plurality of rows and columns, and for example, each of shared pixels 111 defined in units including pixels arranged in two rows and two columns may include four sub-pixels 112. According to some example embodiments, the shared pixels may refer to pixels in minimum units for sharing the floating diffusion node.

FIG. 2A is a view illustrating an example of the pixel array 110 having an RGBW pattern structure. According to some example embodiments, the pixel array 110 may include a white pixel W that may receive light in all bands. Referring to FIG. 2A, the pixel array 110 may include a plurality of shared pixels 111. Referring to FIG. 2A, the pixel array 110 may include 64 shared pixels 111. Each of the shared pixels 111 shown in FIG. 2A may include color pixels R, G, and B that may sense colors, and a white pixel W for fast data processing. According to some example embodiments, the shared pixels 111 may include two white pixels W and two color pixels (one of R, G, and B). According to some example embodiments, the shared pixels 111 may include two white pixels W and two blue pixels B. According to some example embodiments, the shared pixels 111 may include two white pixels W and two red pixels R. According to some example embodiments, the shared pixels 111 may include two white pixels W and two green pixels G. According to some example embodiments, the shared pixels 111 may include two white pixels W, one color pixel (one of R, G, and B) and one AF pixel AF. According to some example embodiments, the shared pixels 111 may include two color pixels (one of R, G, and B), one white pixel W, and one auto-focus (AF) pixel AF. According to some example embodiments, the AF pixel AF may be a pixel that may perform an AF function. According to some example embodiments, one microlens (not shown) may be arranged above the AF pixel AF, and may generate information about the focus of light that has passed through the microlens. A detailed structure and arrangement features of the shared pixels 111 ware described in more detail with reference to FIG. 3A.

In some example embodiments, including the example embodiments shown in FIG. 2A, one shared pixel 111 includes four sub-pixels 112. However, example embodiments are not limited thereto. According to some example embodiments, one shared pixel 111 according to the inventive concepts may include 9 or 16 sub-pixels 112. Hereinafter, for convenience of explanation, it is assumed that one shared pixel 111 includes four sub-pixels 112.

Referring to FIG. 2A, the color of sub-pixels 112 included in one shared pixel 111 may be up to a maximum of two. However, the structure of the pixel array 110 according to the inventive concepts is not limited thereto, and the color of sub-pixels 112 included in one shared pixel 111 may be three or more. According to some example embodiments, one shared pixel 111 may include four sub-pixels 112, e.g., two white pixels W that face each other in a diagonal direction, and one red pixel R and one green pixel G that face each other in the diagonal direction. Hereinafter, for convenience of explanation, it is assumed that the structure of the shared pixel 111 is the same as that of FIG. 2A.

FIG. 2B is a view illustrating a pixel array according to some example embodiments.

Referring to FIG. 2B, an example of a pixel array 110' including eight shared pixels 111_1 through 111_8 including sub-pixels 112-1 is shown. According to some example embodiments, AF pixels 112_6 and 112_7 may be included in some shared pixels 111_6 and 111_7. According to some example embodiments, the AF pixels 112_6 and 112_7 shown in FIG. 2B may correspond to a green pixel G and a white pixel W, respectively. In a first line of the pixel array 110', the shared pixels 111_1, 111_2, 111_3, and 111_4 including the green pixel G, the red pixel R, and the white pixel W may be arranged side-by-side. In a second line of the pixel array 110', the shared pixels 111_5, 111_6, 111_7, and 111_8 including the blue pixel B, the green pixel G, and the white pixel W may be arranged side-by-side. A pixel circuit corresponding to the pixel array 110' of FIG. 2B is described below with reference to FIG. 4.

Figure 3A:
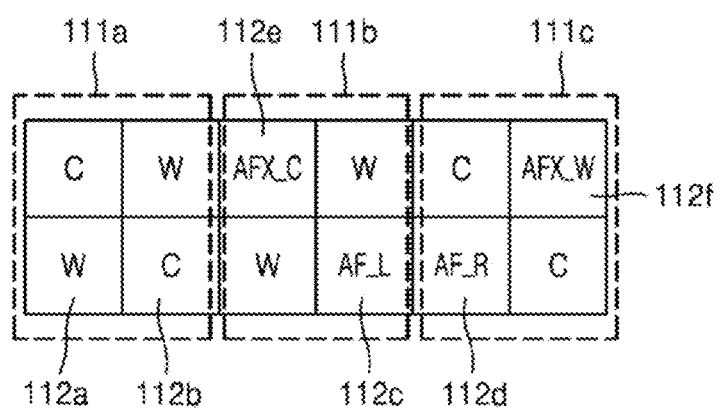
FIGS. 3A and 3B are views illustrating an example of first through third shared pixels and control lines connected to the first through third shared pixels according to some example embodiments.
Figure 3B:
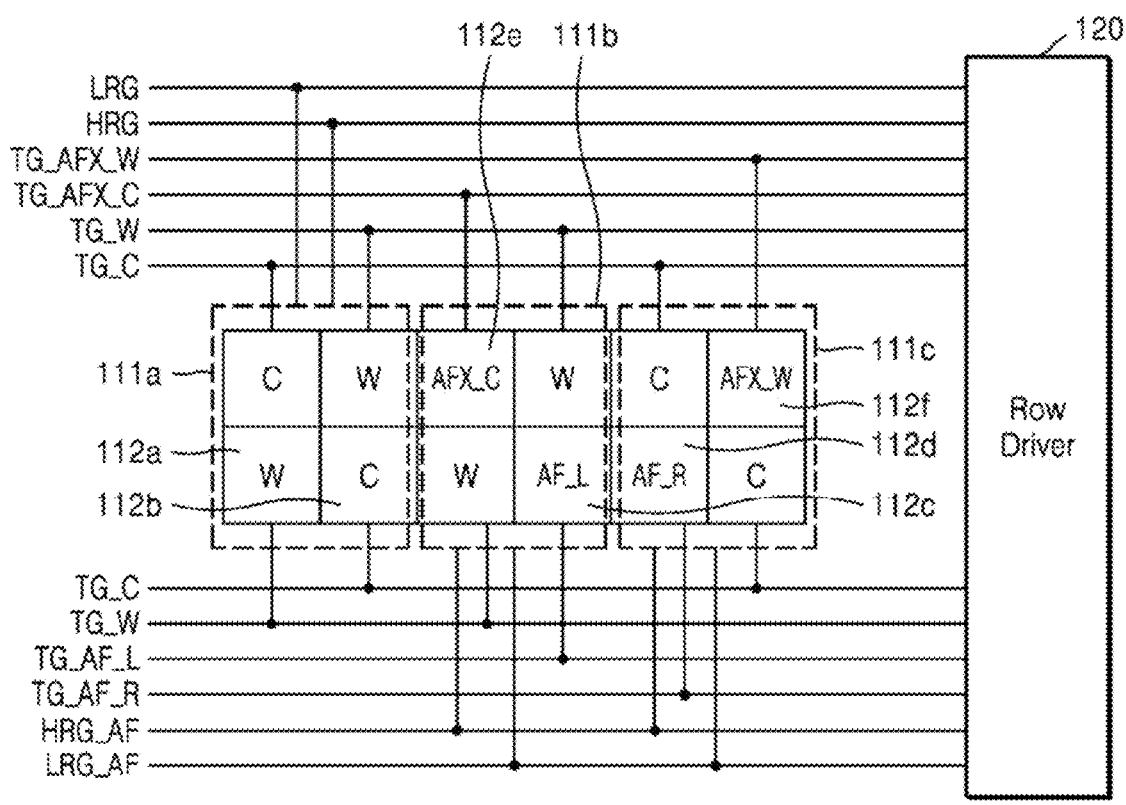

FIGS. 3A and 3B are views illustrating first through third shared pixels and control lines connected to the first through third shared pixels according to some example embodiments.

Referring to FIG. 3A, a pixel array in which a first shared pixel 111a, a second shared pixel 111b, and a third shared pixel 111c are arranged side-by-side is shown. Each of the first shared pixel 111a, the second shared pixel 111b, and the third shared pixel 111c may include four sub-pixels. The first shared pixel 111a may include two white pixels 112a (e.g., a first two white pixels of the plurality of white pixels 112a of the pixel array) and two color pixels 112b (e.g., a first two color pixels of the plurality of color pixels 112b of the pixel array). The two white pixels 112a of the first shared pixel 111a may face each other in the diagonal direction. The two color pixels 112b of the first shared pixel 111a may face each other in the diagonal direction. According to some example embodiments, the color pixels 112b of the first shared pixel 111a may be one of a green pixel, a blue pixel, and a red pixel. The second shared pixel 111b may include two white pixels 112a (e.g., a second two white pixels), one AF pixel 112c, and one AFX_C pixel 112e. The two white pixels 112a of the second shared pixel 111b may face each other in the diagonal direction. The AF pixel 112c and the AFX_C pixel 112e of the second shared pixel 111b may face each other in the diagonal direction. According to some example embodiments, the AFX_C pixel 112e may be a color pixel. The third shared pixel 111c may include two color pixels 112b (e.g., a second two color pixels), one AF pixel 112d, and one AFX_W pixel 112f. The two color pixels 112b of the third shared pixel 111c may face each other in the diagonal direction. The AF pixel 112d and the AFX_W pixel 112f of the third shared pixel 111c may face each other in the diagonal direction. According to some example embodiments, the AFX_W pixel 112f may be a white pixel. According to some example embodiments, the second shared pixel 111b and the third shared pixel 111c may be arranged side-by-side. One microlens (not shown) may be arranged above the AF pixel 112c of the second shared pixel 111b and the AF pixel 112d of the third shared pixel 111c. According to some example embodiments, the AF pixel 112c of the second shared pixel 111b may be an AF pixel AF_L that corresponds to a left region of the microlens. The AF pixel 112*d* of the third shared pixel 111*c* may be an AF pixel AF_R that corresponds to a right region of one microlens.

According to some example embodiments, the AFX_C pixel 112*e* and the AFX_W pixel 112*f* may refer to pixels that face the AF pixels 112*c* and 112*d* in one shared pixel in the diagonal direction. The AFX_C pixel 112*e* may refer to a case where a pixel facing the AF pixel 112*c* in the diagonal direction is a color pixel. The AFX_W pixel 112*f* may refer to a case where a pixel facing the AF pixel 112*d* in the diagonal direction is a white pixel.

Referring to FIG. 3A, the first shared pixel 111*a*, the second shared pixel 111*b*, and the third shared pixel 111*c* are arranged side-by-side. However, it should be understood that this arrangement is for understanding and arrangements may differ from that shown in FIG. 3A.

In some example embodiments of the inventive concepts as described below, the meaning of the first shared pixel 111*a*, the second shared pixel 111*b*, and the third shared pixel 111*c* may be having a pixel structure of the first shared pixel 111*a*, the second shared pixel, and the third shared pixel 111*c*.

FIG. 3B is a view simply illustrating a plurality of control lines connected to the first through third shared pixels 111*a*, 111*b*, and 111*c* shown in FIG. 3A.

Referring to FIG. 3B, a plurality of control lines respectively connected to the first through third shared pixels 111*a* through 111*c* are shown. Referring to FIG. 3B, the plurality of control lines may include a white pixel control line TG_W, a color pixel control line TG_C, AF pixel control lines TG_AF_L and TG_AF_R, AFX pixel control lines TG_AFX_W and TG_AFX_C, a first high conversion gain control line HRG, a first low conversion gain control line LRG, a second high conversion gain control line HRG_AF, and a second low conversion gain control line LRG_AF. The plurality of control lines shown in FIG. 3B may be connected to the row driver 120.

Referring to FIG. 3B, a configuration in which the plurality of control lines are connected to sub-pixels of each of the first through third shared pixels 111*a* through 111*c* is shown. The connection of FIG. 3B is for convenience of explanation. According to some example embodiments, the white pixel control line TG_W, the color pixel control line TG_C, the AF pixel control lines TG_AF_L and TG_AF_R, and the AFX pixel control lines TG_AFX_W and TG_AFX_C may be connected to a gate of a transfer transistor serially connected to a photodiode of sub-pixels to which each control line is connected. According to some example embodiments, the first high conversion gain control line HRG, the first low conversion gain control line LRG, the second high conversion gain control line HRG_AF, and the second low conversion gain control line LRG_AF may be connected to a gate of a high conversion gain transistor or a gate of a low conversion gain transistor of each shared pixel. A detailed connection structure of control lines and sub-pixels is described in more detail with reference to FIG. 4. Hereinafter, the meaning of the control line connected to the pixel may be that the control line is connected to the gate of the transfer transistor or conversion gain transistor of the pixel.

Referring to FIG. 3B, the white pixel control line TG_W may be connected to the white pixels 112*a* of the first shared pixel 111*a* and the white pixels 112*a* of the second shared pixel 111*b*. The color pixel control line TG_C may be connected to color pixels 112*b* of the first shared pixel 111*a* and color pixels 112*b* of the third shared pixel 111*c*. The AF pixel control lines TG_AF_L and TG_AF_R may be respectively connected to the AF pixel 112*c* of the second shared pixel 111*b* and the AF pixel 112*d* of the third shared pixel 111*c*. According to some example embodiments, the AF pixel control lines TG_AF_L and TG_AF_R may include a first AF pixel control line TG_AF_L connected to a left AF pixel AF_L of the second shared pixel 111*b* and a second AF pixel control line TG_AF_R connected to a right AF pixel AF_R of the third shared pixel 111*c*. The AFX pixel control lines TG_AFX_W and TG_AFX_C may be connected to the AFX_C pixel 112*e* of the second shared pixel 111*b* and the AFX_W pixel 112*f* of the third shared pixel 111*c*. The AFX pixel control lines TG_AFX_W and TG_AFX_C may include a first AFX pixel control line TG_AFX_C connected to the AFX_C pixel 112*e* that is a color pixel of the second shared pixel 111*b* and a second AFX pixel control line TG_AFX_W connected to the AFX_W pixel 112*f* that is a white pixel of the third shared pixel 111*c*. The first high conversion gain control line HRG and the first low conversion gain control line LRG may be respectively connected to a high conversion gain transistor and a low conversion gain transistor of a pixel circuit of the first shared pixel 111*a*. The second high conversion gain control line HRG_AF and the second low conversion gain control line LRG_AF may be respectively connected to a high conversion gain transistor and a low conversion gain transistor of the pixel circuit of each of the second shared pixel 111*b* and the third shared pixel 111*c*.

Referring to FIG. 3B, a control line corresponding to the feature of a corresponding sub-pixel may be connected to each gate of a transfer transistor connected to a photodiode corresponding to the sub-pixels of the first through third shared pixels 111*a* through 111*c*.

According to some example embodiments, a white pixel control line TG_W, a color pixel control line TG_C, a first high conversion gain control line HRG, and a first low conversion gain control line LRG may be connected to the first shared pixel 111*a* that does not include the AF pixel. According to some example embodiments, a white pixel control line TG_W, a first AF pixel control line TG_AF_L, a first AFX pixel control line TG_AFX_C, a second high conversion gain control line HRG_AF, and a second low conversion gain control line LRG_AF may be connected to the second shared pixel 111*b* including the AF pixel 112*c*. According to some example embodiments, a color pixel control line TG_C, a second AF pixel control line TG_AF_R, a second AFX pixel control line TG_AFX_W, a second high conversion gain control line HRG_AF, and a second low conversion gain control line LRG_AF may be connected to the third shared pixel 111*c* including the AF pixel 112*d*.

According to some example embodiments, sub-pixels having the same color from among the sub-pixels of each of the first shared pixel 111*a*, the second shared pixel 111*b*, and the third shared pixel 111*c* arranged side by side may be connected to the same control line. For the sub-pixels facing the AF pixels 112*c* and 112*d* in the diagonal direction, they may be connected to separate AFX pixel control lines TG_AFX_W and TG_AFX_C. When a sub-pixel arranged in contact with the AF pixels 112*c* and 112*d* in the diagonal direction is a color pixel, the sub-pixel may be connected to a first AFX pixel control line TG_AFX_C. When a sub-pixel arranged in contact with the AF pixels 112*c* and 112*d* in the diagonal direction is a white pixel, the sub-pixel may be connected to a second AFX pixel control line TG_AFX_W. The AF pixels 112*c* and 112*d* among the sub-pixels of each of the first shared pixel 111*a*, the second shared pixel 111*b*, and the third shared pixel 111*c* may be respectively connected to the AF pixel control lines TG_AF_R and TG_AF_L. In FIG. 3B, the AF pixel control lines TG_AF_L and TG_AF_R may be separately connected to the AF pixel 112c arranged in the left region of the microlens and the AF pixel 112d arranged in the right region of the microlens. However, the AF pixel control lines TG_AF_L and TG_AF_R may also be connected to one AF pixel control line (not shown).

Figure 4:
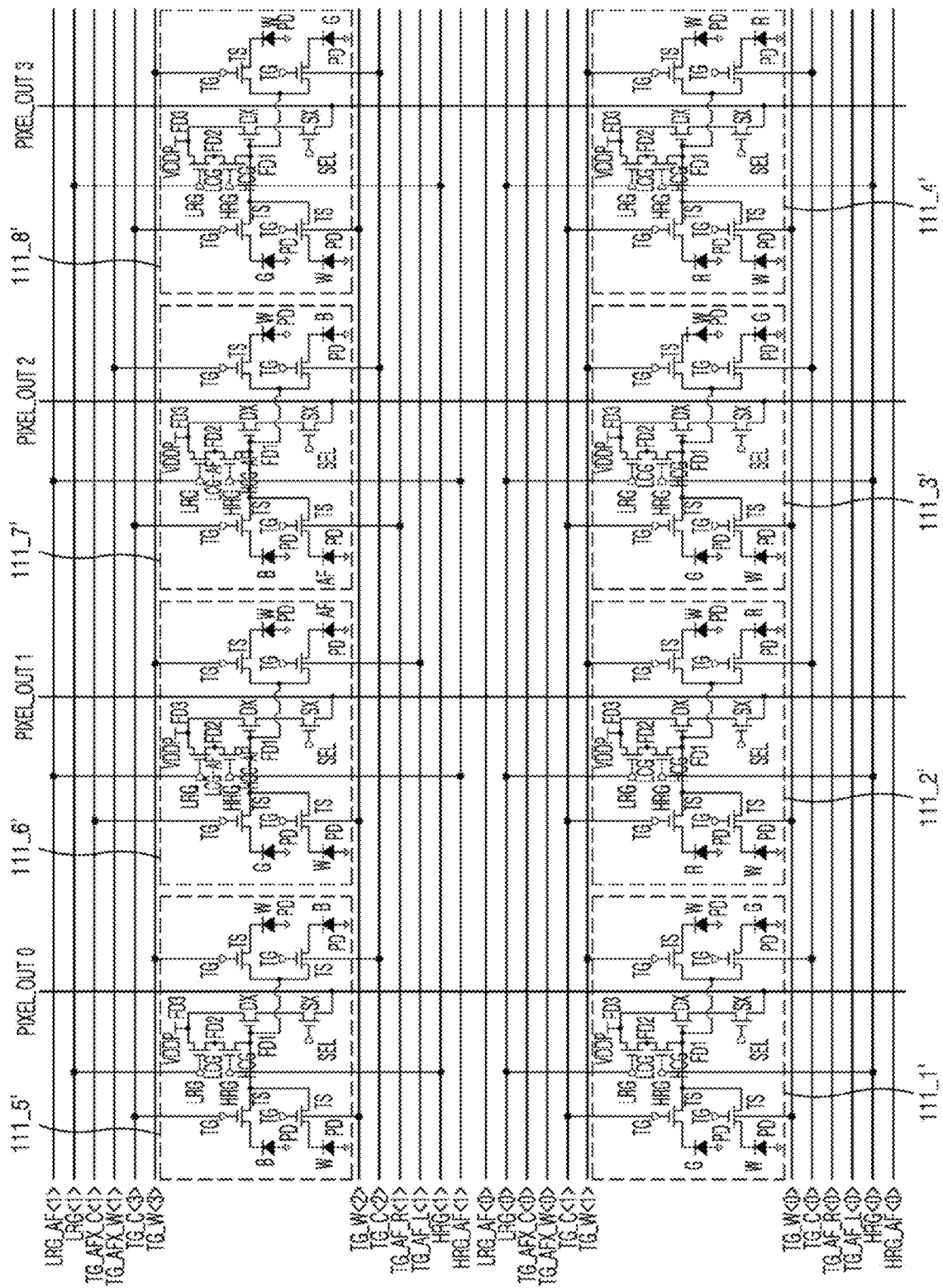
FIG. 4 is a circuit diagram corresponding to the pixel array shown in FIG. 2B according to some example embodiments.

FIG. 4 is a circuit diagram corresponding to the pixel array shown in FIG. 2B according to some example embodiments.

Referring to FIG. 4, a circuit diagram corresponding to eight shared pixels 111_1 through 111_8 shown in FIG. 2B is shown. Referring to FIG. 4, eight first to eighth pixel circuits 111_1' through 111_8' (111_1', 111_2', 111_3', 111_4', 111_5', 111_6', 111_7', and 111_8') respectively corresponding to eight shared pixels are shown. Each of the pixel circuits 111_1' through 111_8' may correspond to one shared pixel including four sub-pixels. According to some example embodiments, each of the first to eighth pixel circuits 111_1' through 111_8' may include four photodiodes PD respectively corresponding to four sub-pixels and a plurality of transistors. For example, each of the first to eighth pixel circuits 111_1' through 111_8' may include a transfer transistor TS, a high conversion gain transistor HCG, a low conversion gain transistor LCG, a driving transistor DX, and a selection transistor SX. Control signals that may control each of the plurality of transistors may be applied to the first to eighth pixel circuits 111_1' through 111_8', and at least a portion of the control signals may be generated in the row driver.

According to some example embodiments, the configuration of eight first to eighth pixel circuits 111_1' through 111_8' is substantially the same except for the type of photodiodes of each of the first to eighth pixel circuits 111_1' through 111_8'. Thus, only the configuration of one fifth pixel circuit 111_5' is described.

The photodiode PD may generate optical electric charges that vary depending on the intensity of light. For example, the photodiode PD may generate electrons that are negative electric charges and holes that are positive electric charges in proportion to the amount of incident light. The optical electric charges generated by the photodiode PD may be transmitted to first through third floating diffusion nodes FD1 through FD3 and accumulated thereon. A parasitic capacitor may be formed in the first through third floating diffusion nodes FD1 through FD3, or an actual capacitor device may be connected to the first through third floating diffusion nodes FD1 through FD3.

The fifth pixel circuit 111_5' may include the transfer transistor TS. One end of the transfer transistor TS may be connected to the photodiode PD, and the other end of the transfer transistor TS may be connected to a first floating diffusion node FD1. The transfer transistor TS may be turned on or turned off in response to a control signal received from the row driver. Thus, the transfer transistor TS may transmit the optical electric charges generated in the photodiode PD to the first floating diffusion node FD1. Gates of transfer transistors TS may be connected to different control lines according to the characteristics of sub-pixels corresponding to the photodiode PD serially connected to the transfer transistor TS. A detailed description thereof is provided below.

The fifth pixel circuit 111_5' may include a high conversion gain transistor HCG. One end of the high conversion gain transistor HCG may be connected to the first floating diffusion node FD1, and the other end of the high conversion gain transistor HCG may be connected to the second floating diffusion node FD2. The high conversion gain transistor HCG may be turned on or turned off in response to an HRG signal received from the row driver. Thus, the high conversion gain transistor HCG may connect or may not connect the first floating diffusion node FD1 to the second floating diffusion node FD2.

The fifth pixel circuit 111_5' may include a low conversion gain transistor LCG. One end of the low conversion gain transistor LCG may be connected to the second floating diffusion node FD2, and the other end of the low conversion gain transistor LCG may be connected to the third floating diffusion node FD3. The low conversion gain transistor LCG may be turned on or turned off in response to an LRG signal received from the row driver. Thus, the low conversion gain transistor LCG may connect or may not connect the second floating diffusion node FD2 to the third floating diffusion node FD3.

According to some example embodiments, a conversion gain of the fifth pixel circuit 111_5' may be controlled depending on whether the high conversion gain transistor HCG and the low conversion gain transistor LCG of the fifth pixel circuit 111_5' are turned on or turned off. When the high conversion gain transistor HCG and the low conversion gain transistor LCG are turned on, as the first floating diffusion node FD1, the second floating diffusion node FD2, and the third floating diffusion node FD3 are connected to one another, the capacitance of the floating diffusion node of the pixel circuit may be increased, and the conversion gain of the floating diffusion node of the pixel circuit may be decreased. According to some example embodiments, when the high conversion gain transistor HCG is turned off and the low conversion gain transistor LCG is turned on, the second floating diffusion node FD2 and the first floating diffusion node FD1 may not be connected to each other, and the second floating diffusion node FD2 and the third floating diffusion node FD3 may be connected to each other. As the low conversion gain transistor LCG is turned on, the floating diffusion node of the pixel circuit may have low capacitance so that the fifth pixel circuit 111_5' may operate in a high conversion gain mode. According to some example embodiments, the high conversion gain mode may be an operation mode in a low light region. According to some example embodiments, when the high conversion gain transistor HCG is turned on and the low conversion gain transistor LCG is turned off, the second floating diffusion node FD2 and the first floating diffusion node FD1 may be connected to each other, and the second floating diffusion node FD2 and the third floating diffusion node FD3 may not be connected to each other. As the high conversion gain transistor HCG is turned on, the floating diffusion node of the pixel circuit may have a high capacitance so that the fifth pixel circuit 111_5' may operate in a low conversion gain mode. According to some example embodiments, the low conversion gain mode may be an operation mode in a high light region.

According to some example embodiments, when the high conversion gain transistor HCG and the low conversion gain transistor LCG are turned off, the floating diffusion node of the pixel circuit has a low capacitance so that the fifth pixel circuit 111_5' may operate in the high conversion gain mode.

The fifth pixel circuit 111_5' may include a driving transistor DX. One end of the driving transistor DX may be connected to the selection transistor SX, and an operation voltage VDDP may be applied to the other end of the driving transistor DX. The driving transistor DX may operate as a source follower based on a bias current generated by a current source connected to a column line PIXEL_OUT 0. The driving transistor DX may output a voltage corresponding to charges accumulated on at least one of the first through third floating diffusion nodes FD1 through FD3 as a pixel signal.

The fifth pixel circuit 111_5' may include a selection transistor SX. One end of the selection transistor SX may be connected to the driving transistor DX, and the other end of the selection transistor SX may be connected to the column line PIXEL_OUT 0. The selection transistor SX may be turned on or turned off in response to a selection signal SEL received from the row driver. When the selection transistor SX is turned on in a readout operation, a pixel signal including a reset signal corresponding to a reset operation or an image signal corresponding to an electric charge-accumulating operation may be output to the column line PIXEL_OUT 0.

According to some example embodiments, the pixel circuits 111_1' through 111_8' shown in FIG. 4 may be an example, and the configuration of the pixel circuit according to the inventive concepts is not limited to the illustration, and some components may be added or removed.

According to some example embodiments of FIG. 4, control lines may be respectively connected to the plurality of transistors included in the pixel circuits 111_1' through 111_8'. Transistors included in each of the pixel circuits 111_1' through 111_8' shown in FIG. 4 may be four transfer transistors TS serially connected to four photodiodes PD, one high conversion gain transistor HCG that may control a conversion gain, one low conversion gain transistor LCG that may control a conversion gain, a driving transistor DX, and a selection transistor SX.

According to some example embodiments of FIG. 4, first through fourth pixel circuits 111_1' through 111_4' and fifth through eighth pixel circuits 111_5' through 111_8' may be connected to separate control lines. The first through fourth pixel circuits 111_1' through 111_4' may be pixels arranged in a first line of the pixel array. The fifth through eighth pixel circuits 111_5' through 111_8' may be pixels arranged in a second line of the pixel array. Pixels arranged in the first line of the pixel array may be connected to the signal line to which signal is first applied. Pixels arranged in the second line of the pixel array may be connected to the signal line to which signal is applied second.

The first through fourth pixel circuits 111_1' through 111_4' may be pixel circuits corresponding to a first shared pixel that does not include an AF pixel. The first through fourth pixel circuits 111_1' through 111_4' may include a high conversion gain transistor HCG, a low conversion gain transistor LCG, a transfer transistor TS serially connected to the photodiode PD corresponding to the white pixel W, and a transfer transistor TS serially connected to the photodiode PD corresponding to a color pixel (one among G, R, and B). A gate of the high conversion gain transistor HCG included in the first through fourth pixel circuits 111_1' through 111_4' may be connected to a first high conversion gain control line HRG<0>. A gate of the low conversion gain transistor LCG included in the first through fourth pixel circuits 111_1' through 111_4' may be connected to a first low conversion gain control line LRG<0>.

A gate of the transfer transistor TS serially connected to the photodiode PD corresponding to the white pixel W included in the first through fourth pixel circuits 111_1' through 111_4' may be connected to white pixel control lines TG_W<0> and TG_W<1>. A gate of the transfer transistor TS serially connected to the photodiode PD corresponding to the color pixel (one among G, R, and B) included in the first through fourth pixel circuits 111_1' through 111_4' may be connected to color pixel control lines TG_C<0> and TG_C<1>.

The sixth and seventh pixel circuits 111_6' and 111_7' may be pixel circuits respectively corresponding to a second shared pixel and a third shared pixel including the AF pixel. The fifth through eighth pixel circuits 111_5' and 111_8' may be pixel circuits corresponding to the first shared pixel that does not include the AF pixel. A gate of the high conversion gain transistor HCG included in the fifth through eighth pixel circuits 111_5' and 111_8' may be connected to a first high conversion gain control line HRG<1>. A gate of the low conversion gain transistor LCG included in the fifth through eighth pixel circuits 111_5' and 111_8' may be connected to a first low conversion gain control line LRG<1>.

A gate of the transfer transistor TS serially connected to the photodiode PD corresponding to the white pixel included in the fifth through eighth pixel circuits 111_5' through 111_8' may be connected to white pixel control lines TG_W<2> and TG_W<3>. A gate of the transfer transistor TS serially connected to the photodiode PD corresponding to the color pixel included in the fifth through eighth pixel circuits 111_5' through 111_8' may be connected to color pixel control lines TG_C<2> and TG_C<3>.

A gate of the high conversion gain transistor HCG-AF included in the sixth and seventh pixel circuits 111_6' and 111_7' may be connected to a second high conversion gain control line HRG_AF<1>. A gate of the low conversion gain transistor LCG-AF included in the sixth and seventh pixel circuits 111_6' and 111_7' may be connected to a second low conversion gain control line LRG_AF<1>. A gate of the transfer transistor TS serially connected to the photodiode PD corresponding to the AF pixel included in the sixth and seventh pixel circuits 111_6' and 111_7' may be connected to AF pixel control lines TG_AF_R<1> and TG_AF_L<1>. A gate of the transfer transistor TS serially connected to the photodiode PD corresponding to the AFX pixel that diagonally faces the AF pixel included in the sixth and seventh pixel circuits 111_6' and 111_7' may be connected to the AFX pixel control lines TG_AFX_C<1> and TG_AFX_W<1>. According to some example embodiments, because the AFX pixel G that diagonally faces the AF pixel included in the sixth pixel circuit 111_6' is a color pixel, a gate of the transfer transistor TS serially connected to the photodiode corresponding to the corresponding pixel may be connected to the first AFX pixel control line TG_AFX_C<1>. According to some example embodiments, because the AFX pixel W that diagonally faces the AF pixel included in the seventh pixel circuit 111_7' is a white pixel, a gate of the transfer transistor TS serially connected to the photodiode corresponding to the corresponding pixel may be connected to the second AFX pixel control line TG_AFX_W<1>.

Figure 5:
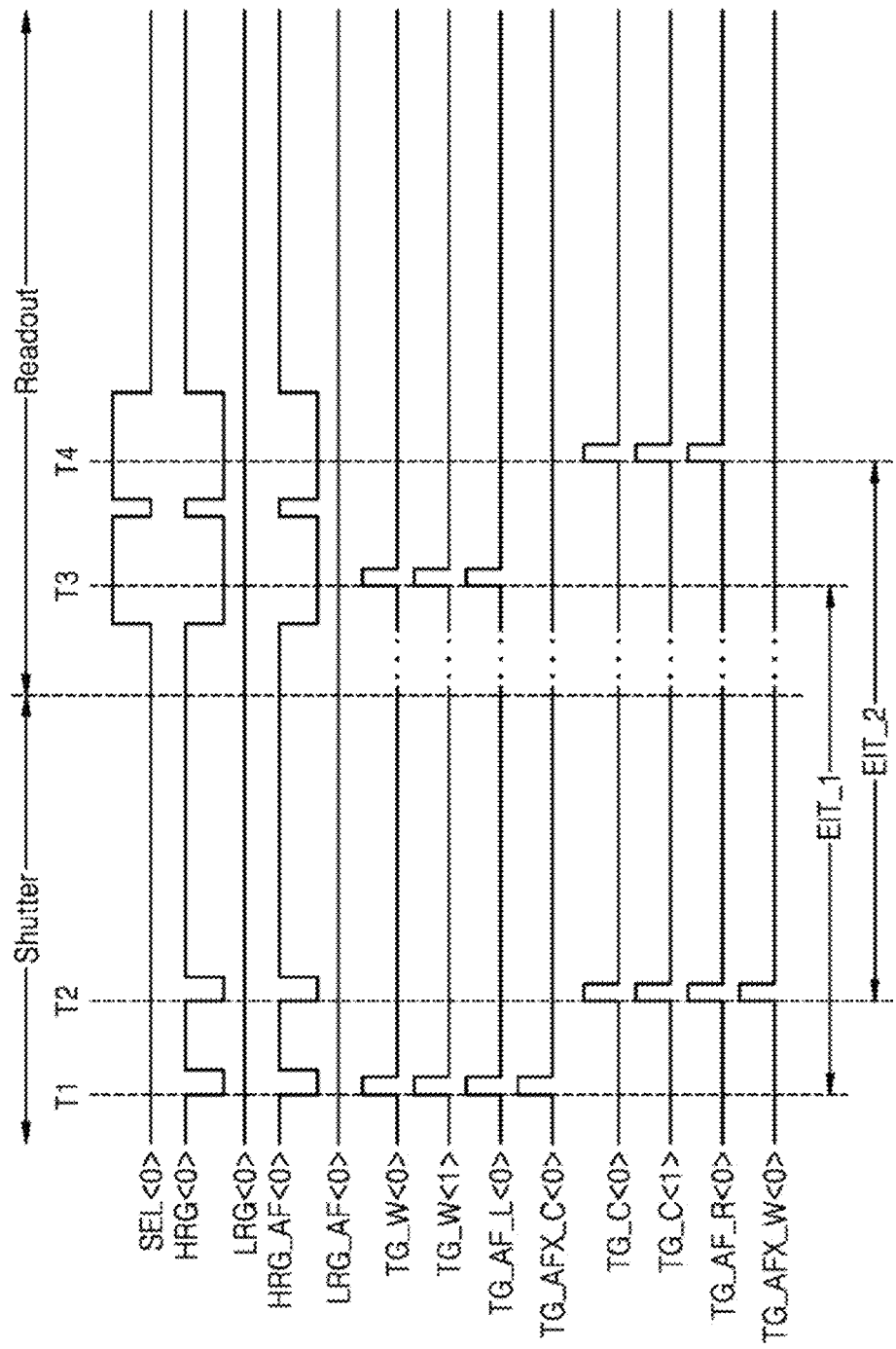
FIGS. 5, 6, and 7 are timing diagrams illustrating signals applied to a plurality of control lines according to some example embodiments.
Figure 6:
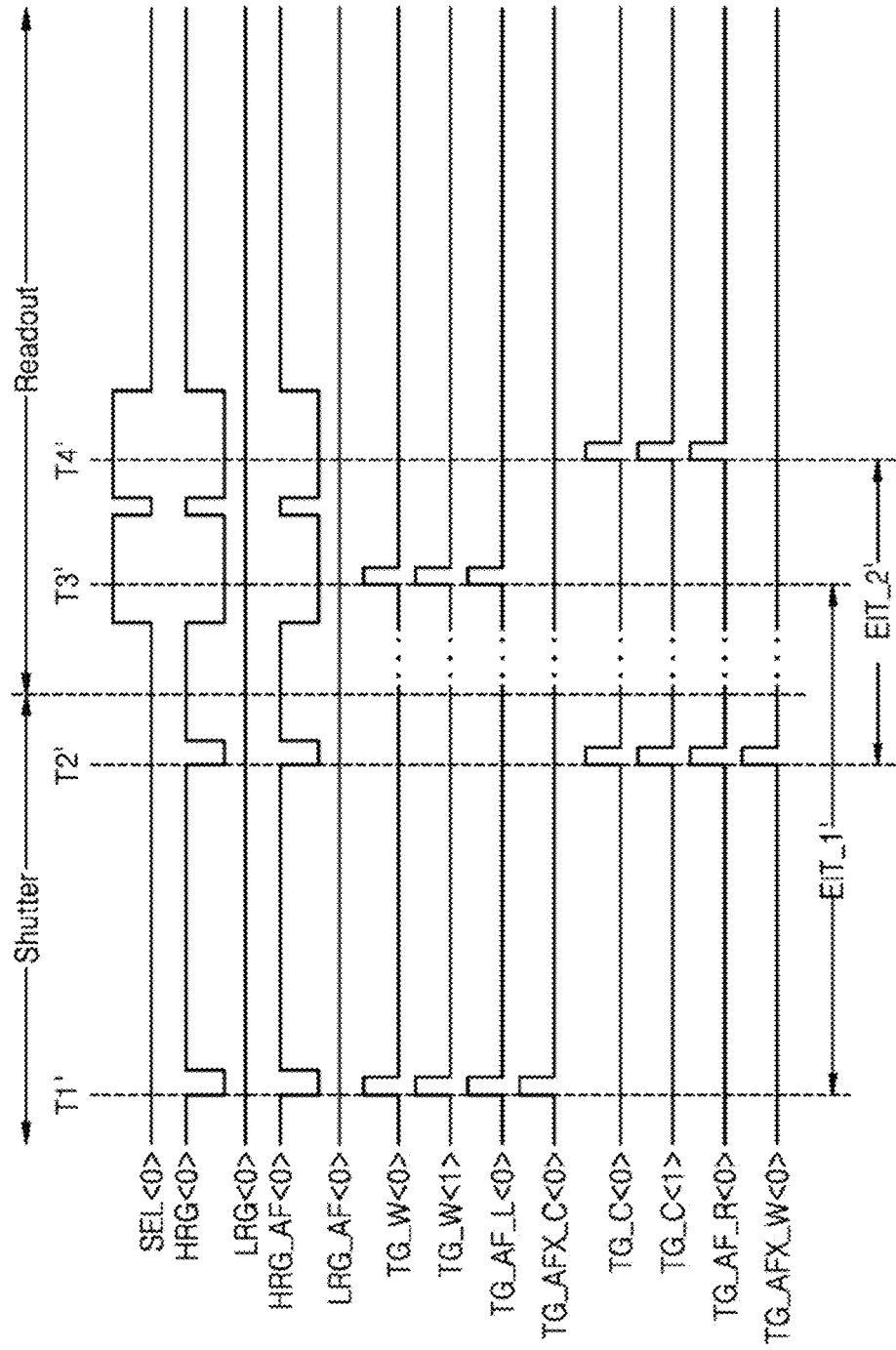
Figure 7:
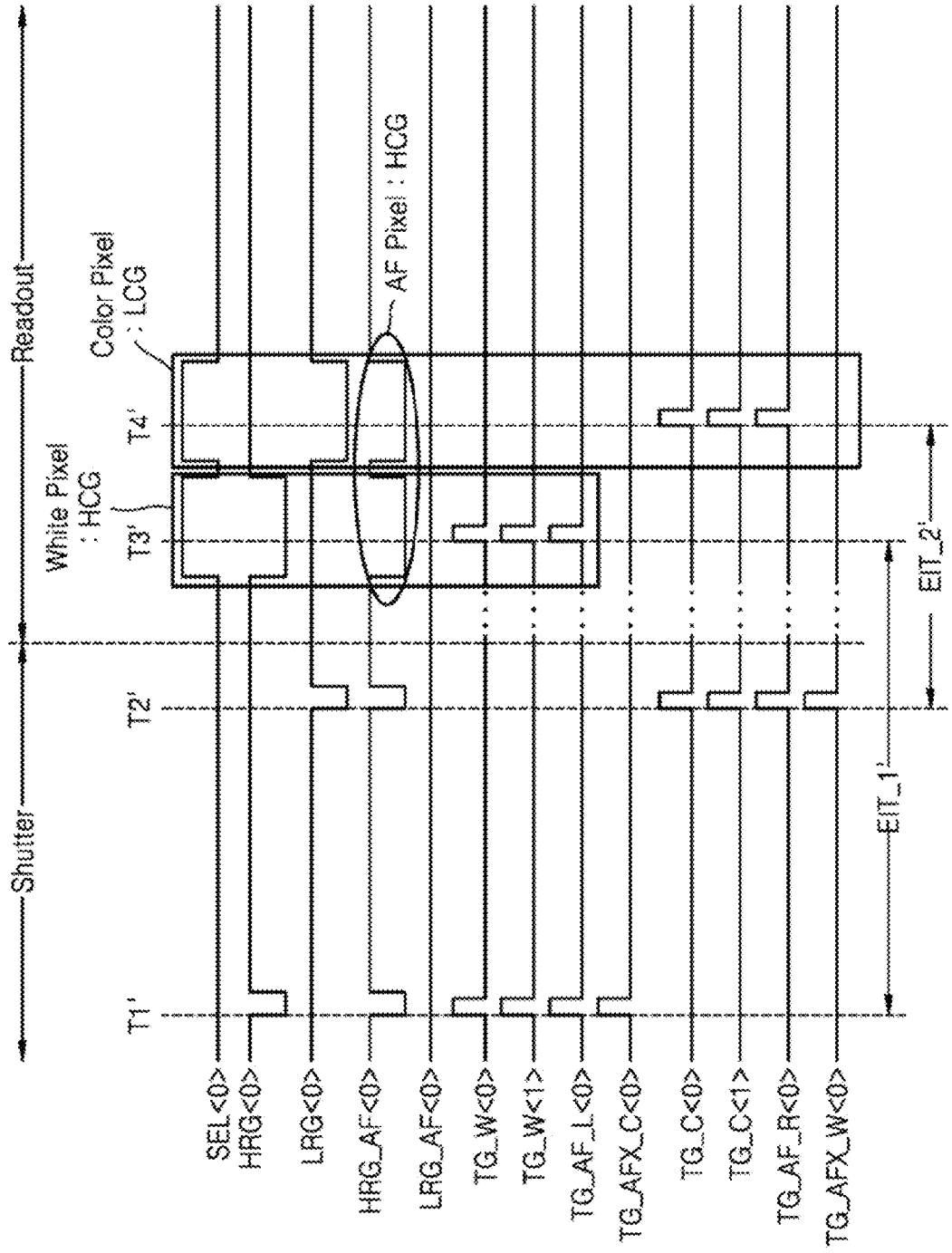

FIGS. 5, 6, and 7 are timing diagrams illustrating signals applied to a plurality of control lines according to some example embodiments.

Referring to FIGS. 5 through 7, a pixel PX may reset the photodiode PD and the first through third floating diffusion nodes FD1 through FD3 during a shutter section (which may be referred to interchangeably as a shutter period, a shutter time period, or the like) and may readout pixel signals from the photodiode PD during a readout section (which may be referred to interchangeably as a readout period, a readout time period, or the like). Hereinafter, operations performed during the shutter section and the readout section are described.

Timing diagrams of FIGS. 5 through 7 may represent signal timings of a plurality of control lines applied to sub-pixels included in the second shared pixel and the third shared pixel of FIG. 3A. According to some example embodiments, the timing diagrams of FIGS. 5 through 7 may represent signal control timings of the plurality of control lines applied by the row driver. According to some example embodiments, the signal timings to be controlled in the plurality of control lines may be controlled by a timing controller.

First, in the shutter section, the white pixel control line signals TG_W<0> and TG_W<1> may transit from a first level, or first magnitude, (e.g., logic low) to a second level, or second magnitude, (e.g., logic high) at T1. The first AF pixel control line signal TG_AF_L<0> and the first AFX pixel control line signal TG_AFX_C<0> may transit from the first level to the second level at T1. According to some example embodiments, the white pixel control line signals TG_W<0> and TG_W<1>, the first AF pixel control line signal TG_AF_L<0>, and the first AFX pixel control line signal TG_AFX_C<0> may be signals applied to the control lines connected to the second shared pixel. According to some example embodiments, a first turn-on timing of sub-pixels included in the second shared pixel may be the same as T1.

In the shutter section, the color pixel control line signals TG_C<0> and TG_C<1> may transit from the first level to the second level at T2. The second AF pixel control line signal TG_AF_R<0> and the second AFX pixel control line signal TG_AFX_W<0> may transit from the first level to the second level at T2. According to some example embodiments, the color pixel control line signals TG_C<0> and TG_C<1>, the second AF pixel control line signal TG_AF_R<0>, and the second AFX pixel control line signal TG_AFX_W<0> may be signals respectively applied to the control lines connected to the third shared pixel. According to some example embodiments, a first turn-on timing of sub-pixels included in the third shared pixel may be the same as T2.

Referring to FIG. 5, a time T1 at which, in the shutter section, the white pixel control line signals TG_W<0> and TG_W<1>, the first AF pixel control line signal TG_AF_L<0>, and the first AFX pixel control line signal TG_AFX_C<0> transit from the first level to the second level may be referred to as a first turn-on timing. A time T2 at which, in the shutter section, the color pixel control line signals TG_C<0> and TG_C<1>, the second AF pixel control line signal TG_AF_R<0>, and the second AFX pixel control line signal TG_AFX_W<0> transit from the first level to the second level may be referred to as a first turn-on timing. According to some example embodiments, at T1 and T2 that are the first turn-on timings in the shutter section, the first high conversion gain control line signal HRG<0> and the second high conversion gain control line signal HRG_AF<0> may transit from the second level to the first level. According to some example embodiments, at T1 and T2 that are the first turn-on timings in the shutter section, the first low conversion gain control line signal LRG<0> and the second low conversion gain control line signal LRG_AF<0> may be maintained at the second level. In the shutter section, the selection signal SEL<0> may be maintained at the first level.

Thus, the first high conversion gain transistor HCG may be turned off, and the first low conversion gain transistor LCG may be turned on. Thus, the second high conversion gain transistor HCG-AF may be turned off, and the second low conversion gain transistor LCG-AF may be turned on.

Thus, at the first turn-on timings T1 and T2, the second shared pixel and the third shared pixel may operate in the high conversion gain mode.

In the readout section, the white pixel control line signals TG_W<0> and TG_W<1> may transit from the first level to the second level at T3. The first AF pixel control line signal TG_AF_L<0> may transit from the first level to the second level at T3.

In the readout section, the color pixel control line signals TG_C<0> and TG_C<1> may transit from the first level to the second level at T4. The second AF pixel control line signal TG_AF_R<0> may transit from the first level to the second level at T4.

Referring to FIG. 5, a time T3 at which, in the readout section, the white pixel control line signals TG_W<0> and TG_W<1> and the first AF pixel control line signal TG_AF_L<0> transit from the first level to the second level may be referred to as a second turn-on timing. A time T4 at which, in the readout section, the color pixel control line signals TG_C<0> and TG_C<1> and the second AF pixel control line signal TG_AF_R<0> transit from the first level to the second level may be referred to as a second turn-on timing. According to some example embodiments, at T3 and T4 that are the second turn-on timings, the first high conversion gain control line signal HRG<0> and the second high conversion gain control line signal HRG_AF<0> may be maintained at the first level. According to some example embodiments, at T3 and T4 that are the second turn-on timings, the first low conversion gain control line signal LRG<0> and the second low conversion control line signal LRG_AF<0> may be maintained at the second level. At a time including T3 and T4 in the readout section, the selection signal SEL<0> may be maintained at the second level.

Referring to FIG. 5, a period between T1 and T3 in the white pixel control line signals TG_W<0> and TG_W<1> may be referred to as a first EIT section EIT_1, and a period between T2 and T4 in the color pixel control line signals TG_C<0> and TG_C<1> may be referred to as a second EIT section EIT_2.

Referring to FIG. 5, the first EIT section EIT_1 and the second EIT section EIT_2 may have the same value. According to some example embodiments, the first EIT section EIT_1 and the second EIT section EIT_2 have the same value so that the EIT of a white pixel and the EIT of a color pixel may be the same.

According to some example embodiments, in the readout section, signals applied to the AFX pixel control lines TG_AFX_C<0> and TG_AFX_W<0> may not be turned on and maintained at the first level. Referring to FIG. 5, the first AFX pixel control line TG_AFX_C<0> may transit from the first level to the second level at time T1 and be turned on first. Then, the first AFX pixel control line TG_AFX_C<0> may not be turned on second and maintained at the first level in the readout section. The second AFX pixel control line TG_AFX_W<0> may transit from the first level to the second level at time T2 and be first turned on. Then, the second AFX pixel control line TG_AFX_W<0> may not be turned on second and maintained at the first level in the readout section. In this way, a signal applied to the first AFX pixel control line TG_AFX_C<0> and a signal applied to the second AFX pixel control line TG_AFX_W<0> may be turned on first in the shutter section and may not be turned on in the readout section. According to some example embodiments, the first AFX pixel control line TG_AFX_C<0> and the second AFX pixel control line TG_AFX_W<0> may be control lines connected to the first AFX pixel and the second AFX pixel that face the AF pixel.

In the case of the AFX pixel facing the AF pixel, a readout operation is not performed. Thus, overflow may occur. According to the inventive concepts, even though the AFX pixel does not perform the readout operation, first turn-on may be performed in the shutter section so that the occurrence of overflow may be prevented. According to some example embodiments, a shared pixel including four sub-pixels may readout two white pixels facing each other in the diagonal direction and two color pixels facing each other in the diagonal direction. In this case, in the case of the shared pixel including the AF pixel, when the sub-pixel facing the AF pixel in the diagonal direction is readout, there may be a fear of confusion with AF pixel data, and the sub-pixel may not be read out. However, when the AFX pixel that is a sub-pixel facing the AF pixel in the diagonal direction is not turned on, overflow of electric charges may occur. Thus, turn-on may be performed in the shutter section so that overflow may be prevented.

FIG. 6 is a timing diagram according to some example embodiments.

In the timing diagram of FIG. 6, a description of redundant features with those of FIG. 5 will be omitted.

Referring to FIG. 6, a time T1' at which, in the shutter section, the white pixel control line signal TG_W<0> and TG_W<1>, the first AF pixel control line signal TG_AF_L<0> and the first AFX pixel control line signal TG_AFX_C<0> transit from the first level to the second level may be referred to as a first turn-on timing. A time T2' at which, in the shutter section, the color pixel control line signals TG_C<0> and TG_C<1>, the second AF pixel control line signal TG_AF_R<0>, and the second AFX pixel control line signal TG_AFX_W<0> transit from the first level to the second level may be referred to as a first turn-on timing.

A time T3' at which, in the readout section, the white pixel control line signal TG_W<0> and TG_W<1> and the first AF pixel control line signal TG_AF_L<0> transit from the first level to the second level may be referred to as a second turn-on timing. A time T4' at which, in the readout section, the color pixel control line signal TG_C<0> and TG_C<1> and the second AF pixel control line signal TG_AF_R<0> transit from the first level to the second level may be referred to as a second turn-on timing.

Referring to FIG. 6, a period between T1' and T3' in the white pixel control line signals TG_W<0> and TG_W<1> may be referred to as a first EIT section EIT_1', and a period between T2' and T4' in the color pixel control line signals TG_C<0> and TG_C<1> may be referred to as a second EIT section EIT_2'.

Referring to FIG. 6, the first EIT section EIT_1' and the second EIT section EIT_2' may have different values. According to some example embodiments, the first EIT section EIT_1' may be longer than the second EIT section EIT_2'. Referring to FIG. 6, EIT of the white pixel may be greater than EIT of the color pixel. According to some example embodiments of FIGS. 5 through 6, EIT of the white pixel may be adjusted to be the same as or greater than EIT of the color pixel so that low light performance in white pixels may be increased.

FIG. 7 is a timing diagram according to some example embodiments.

In the timing diagram of FIG. 7, a description of redundant features with those of FIG. 6 will be omitted.

Referring to FIG. 7, the first turn-on timings T1' and T2' and the second turn-on timings T3' and T4' of the white pixel control line signals TG_W<0> and TG_W<1>, the color pixel control line signals TG_C<0> and TG_C<1>, the AF pixel control line signals TG_AF_L<0> and TG_AF_R<0>, and the AFX pixel control line signals TG_AFX_C<0> and TG_AFX_C<0> in the shutter section and the readout section may be the same as those shown in FIG. 6. According to the timing diagram of FIG. 7, the first EIT section EIT_1' of the white pixel and the second EIT section EIT_2' of the color pixel may be different from each other. According to some example embodiments, the first EIT section EIT_1' of the white pixel may be longer than the second EIT section EIT_2' of the color pixel.

Referring to FIG. 7, at T1' that is the first turn-on timing in the shutter section of the white pixel control line signals TG_W<0> and TG_W<1>, the first AF pixel control line signal TG_AF_L<0>, and the first AFX pixel control line signal TG_AFX_C<0> including the white pixel, the first high conversion gain control line signal HRG<0> and the second high conversion gain control line signal HRG_AF<0> may transit from the second level to the first level. According to some example embodiments, at T1' that is the first turn-on timing, the first low conversion gain control line signal LRG<0> and the second low conversion gain control line signal LRG_AF<0> may be maintained at the second level. In the shutter section, the selection signal SEL<0> may be maintained at the first level.

Referring to FIG. 7, at T2' that is the first turn-on timing in the shutter section of the color pixel control line signals TG_C<0> and TG_C<1>, the second AF pixel control line signal TG_AF_R<0>, and the second AFX pixel control line signal TG_AFX_W<0> including the color pixel, the first low conversion gain control line signal LRG<0> and the second high conversion gain control line signal HRG_AF<0> may transit from the second level to the first level. According to some example embodiments, at T2' that is the first turn-on timing of the color pixel, the first high conversion gain control line signal HRG<0> and the second low conversion gain control line signal LRG_AF<0> may be maintained at the second level.

At T3' that is a second turn-on timing in the readout section of the white pixel control line signals TG_W<0> and TG_W<1> and the first AF pixel control line signal TG_AF_L<0>, the first high conversion gain control line signal HRG<0> and the second high conversion gain control line signal HRG_AF<0> may be maintained at the first level. According to some example embodiments, at T3' that is the second turn-on timing, the first low conversion gain control line signal LRG<0> and the second low conversion gain control line signal LRG_AF<0> may be maintained at the second level. In the readout section, the selection signal SEL<0> may be maintained at the second level.

At T4' that is a second turn-on timing in the readout section of the color pixel control line signals TG_C<0> and TG_C<1> and the second AF pixel control line signal TG_AF_R<0>, the first low conversion gain control line signal LRG<0> and the second high conversion gain control line signal HRG_AF<0> may be maintained at the first level. According to some example embodiments, at T4' that is the second turn-on timing, the first high conversion gain control line signal HRG<0> and the second low conversion gain control line signal LRG_AF<0> may be maintained at the second level.

According to the timing diagram of FIG. 7, the EIT and the conversion gain of the white pixel and the color pixel may be controlled to have different values. According to the timing diagram of FIG. 7, EIT of the white pixel may have a greater value than EIT of the color pixel, and the white pixel may operate in a high conversion gain operation mode, and the color pixel may operate in a low conversion gain operation mode. According to some example embodiments of FIG. 7, the white pixel may operate in the high conversion gain operation mode so that SNR may be increased. The color pixel may operate in the low conversion gain operation mode so that HDR in the high light region may be increased.

According to some example embodiments, in the timing diagrams of FIGS. 5 through 7, signal timings of control lines applied to sub-pixels included in the first shared pixel are not shown. However, control lines connected to sub-pixels included in the first shared pixel among the plurality of control lines shown in the timing diagrams of FIGS. 5 through 7, for example, the white pixel control line and the color pixel control line may be similarly applied shown in the timing diagrams of FIGS. 5 through 7.

Figure 8:
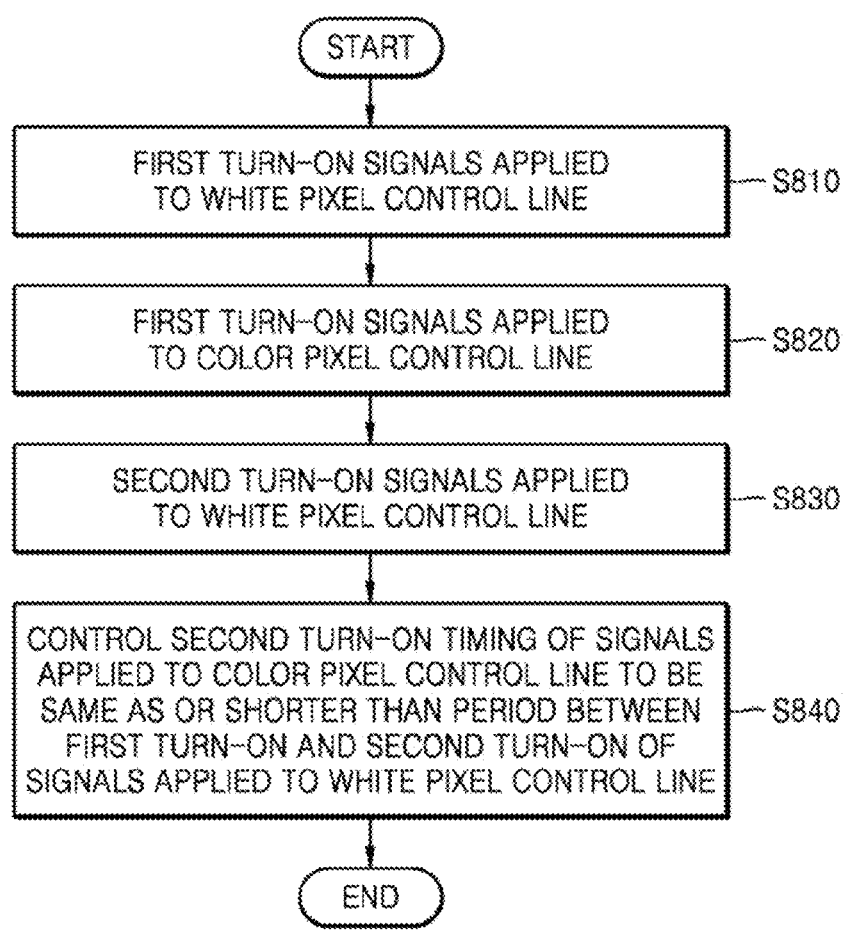
FIGS. 8, 9A, 9B, and 10 are flowcharts illustrating an operation method of an image sensor according to some example embodiments.

FIGS. 8, 9A, 9B, and 10 are flowcharts illustrating an operation method of an image sensor according to some example embodiments. FIG. 8 may be a flowchart illustrating a method of controlling each of EIT of the white pixel and EIT of the color pixel of the pixel array included in the image sensor according to the inventive concepts. In the operation method of the image sensor shown in FIGS. 8 through 10, the turn-on timings of the plurality of control lines may be controlled by the timing controller 150 of FIG. 1.

Referring to FIG. 8, signals applied to white pixel control lines may be first turned-on in operation S810. Then, signals applied to color pixel control lines may be first turned-on in operation S820. First turning-on of each of the signals applied to the white pixel control lines and the signals applied to the color pixel control lines may be performed in the shutter section. According to some example embodiments, the first turn-on timing of the signals applied to the white pixel control lines and the first turn-on timing of the signals applied to the color pixel control lines may be different from each other. In some example embodiments, including the example embodiments shown in FIGS. 5 through 7, some example embodiments in which the first turn-on timing of the signals applied to the white pixel control lines is faster than the first turn-on timing of the signals applied to the color pixel control lines, is shown. However, the inventive concepts may not be limited thereto. The first turn-on timing of the signals applied to the white pixel control lines may be slower than the first turn-on timing of the signals applied to the color pixel control lines.

When first turn-on in the shutter section is terminated, the signals applied to the white pixel control lines in the readout section may be second turned-on in operation S830. The second turn-on timing of the signals applied to the color pixel control lines may be controlled to be the same as or shorter than a period between the first turn-on and the second turn-on of the signals applied to the white pixel control lines in operation S840.

That is, a section between the first turn-on timing and the second turn-on timing of the signals applied to the white pixel control lines and a section between the first turn-on timing and the second turn-on timing of the signals applied to the color pixel control lines may be the same. The section between the first turn-on timing and the second turn-on timing of the signals applied to the white pixel control lines may be longer than the section between the first turn-on timing and the second turn-on timing of the signals applied to the color pixel control lines.

In operation S840, the second turn-on timing of the signals applied to the color pixel control lines is controlled. However, the inventive concepts are not limited thereto, and the second turn-on timing of the signals applied to the white pixel control lines may be controlled.

Figure 9A:
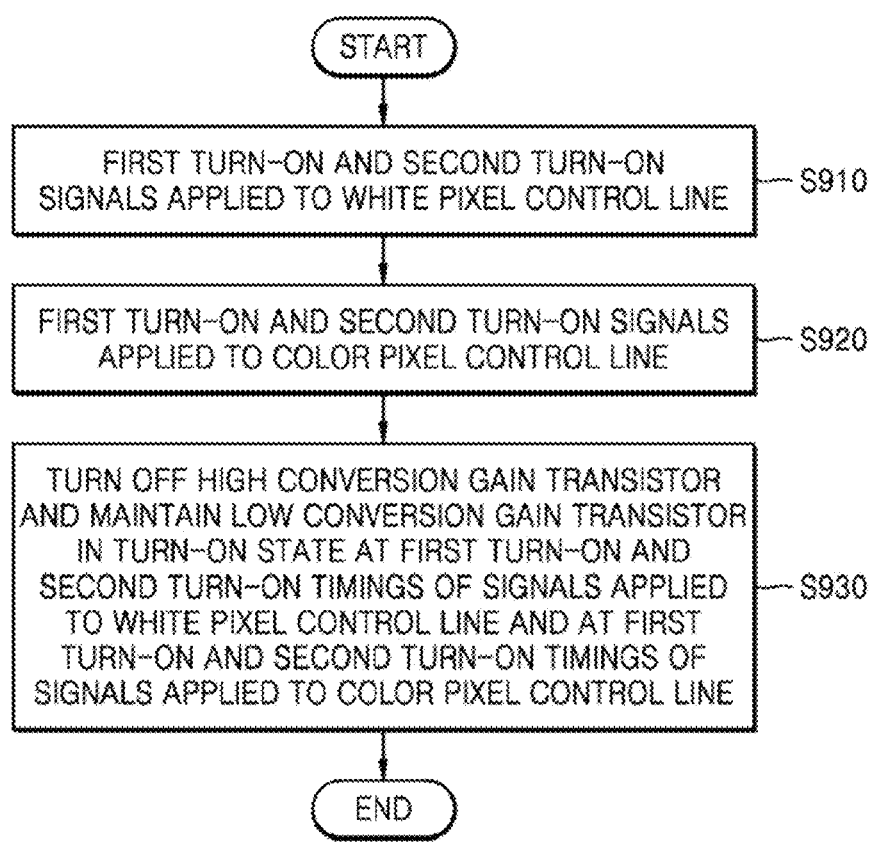
Figure 9B:
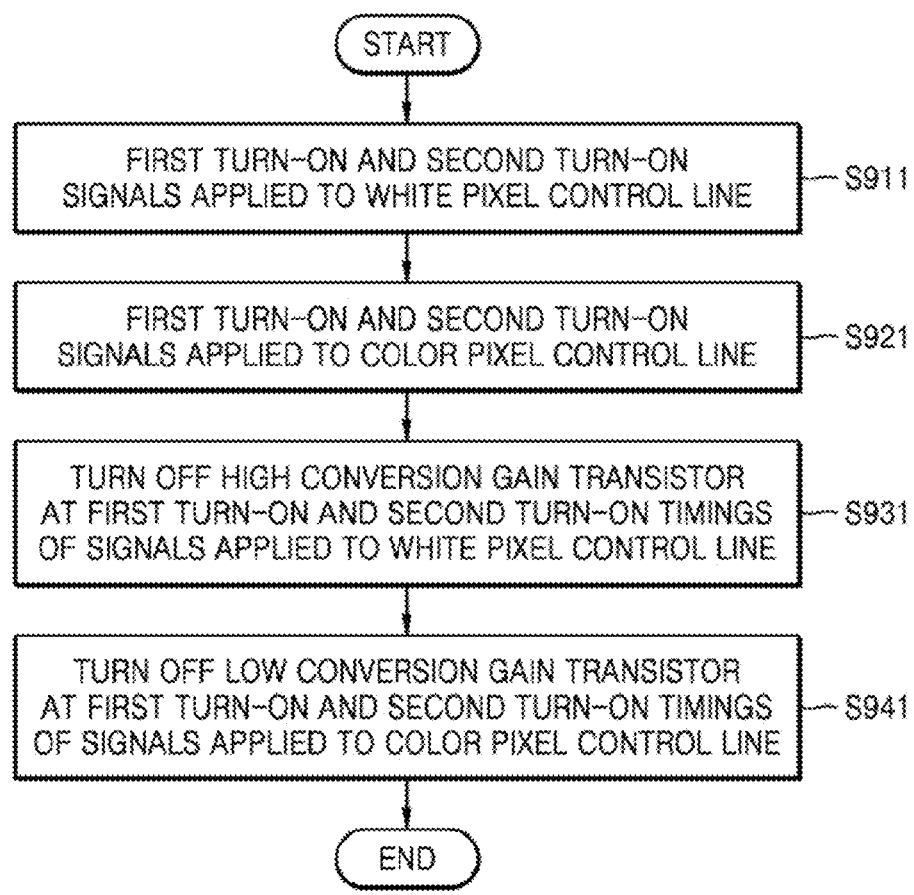

FIGS. 9A and 9B may be flowcharts illustrating a method of controlling conversion gains according to some example embodiments.

Referring to FIG. 9A, signals applied to white pixel control lines may be first turned-on and second turned-on in operation S910. The signals applied to color pixel control lines may be first turned-on and second turned-on in operation S920. In this case, a high conversion gain transistor may be turned off at the first turn-on and second turn-on timings of the signals applied to the white pixel control lines and the first turn-on and second turn-on timings of the signals applied to the color pixel control lines, and the low conversion gain transistor may be maintained in a turn-on state in operation S930. Thus, a high conversion gain mode may be maintained during the operation of white pixels and color pixels.

Referring to FIG. 9B, signals applied to white pixel control lines may be first turned-on and second turned-on in operation S911. The signals applied to color pixel control lines may be first turned-on and second turned-on in operation S921. In this case, the high conversion gain transistor may be turned off at the first turn-on and second turn-on timings of the signals applied to the white pixel control lines in operation S931, and the low conversion gain transistor may be maintained in the turn-on state. In this case, the low conversion gain transistor may be turned off at the first turn-on and second turn-on timings of the signals applied to the color pixel control lines in operation S941, and the high conversion gain transistor may be maintained in the turn-on state. Thus, the high conversion gain operation mode may be maintained during the operation of the white pixel, and the low conversion gain operation mode may be maintained during the operation of the color pixel.

Figure 10:
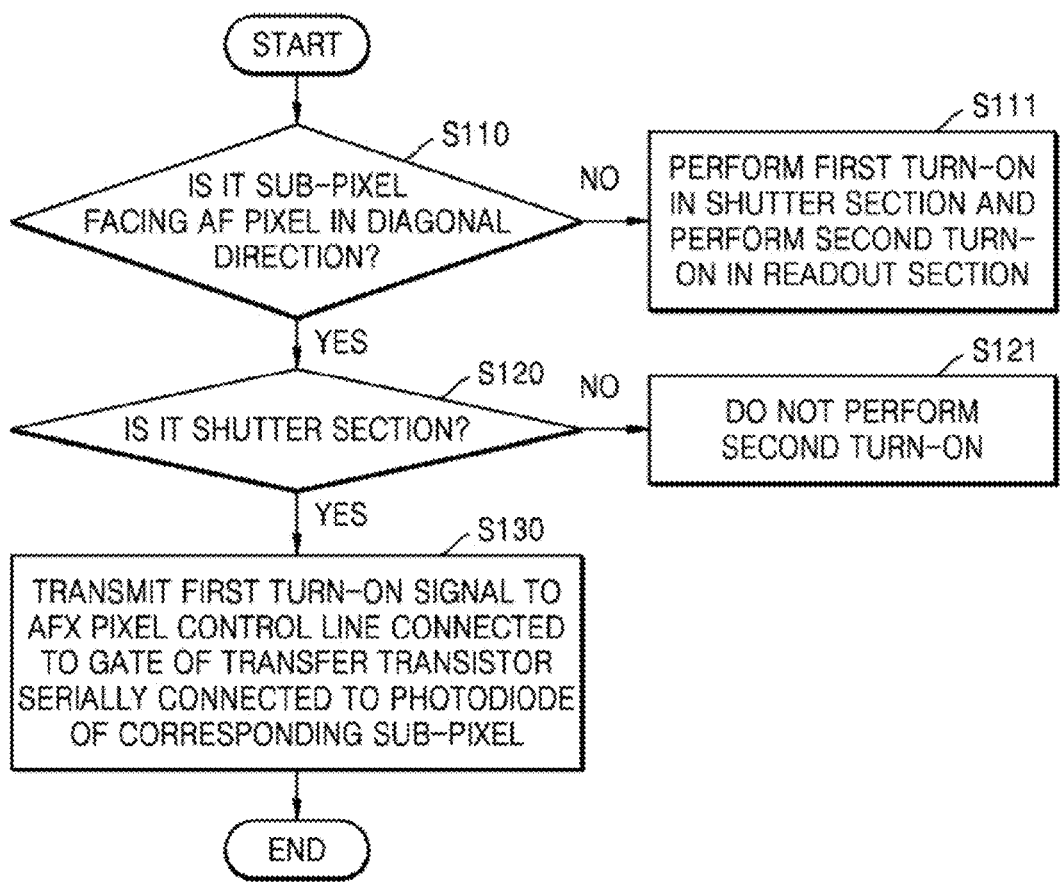

FIG. 10 is a flowchart illustrating a method of controlling signals applied to an AFX pixel according to some example embodiments. It may be confirmed whether a sub-pixel to be controlled is a sub-pixel facing the AF pixel in the diagonal direction, in operation S110. When the sub-pixel to be controlled is not a sub-pixel facing the AF pixel in the diagonal direction, first turn-on may be performed in the shutter section, and second turn-on may be performed in the readout section in operation S111. According to some example embodiments, the sub-pixel that performs first turn-on in the shutter section and second turn-on in the readout section may be a sub-pixel adjacent to the AF pixel in a first direction and in a second direction perpendicular to the first direction. According to some example embodiments, the sub-pixel that performs first turn-on in the shutter section and second turn-on in the readout section may refer to a sub-pixel adjacent to the AF pixel in an X-direction and in a Y-direction. When the sub-pixel to be controlled is a sub-pixel facing the AF pixel in the diagonal direction within one shared pixel, it may be checked whether a section for applying signals for an operation of a corresponding pixel is a shutter section in operation S120. When it is checked that the section is the shutter section in operation S130, a first turn-on signal may be transferred to an AFX pixel control line connected to a gate of the transfer transistor serially connected to a photodiode of the corresponding sub-pixel, so that first turn-on in the shutter section may be performed. When it is checked that the section is not the shutter section in operation S121, second turn-on may not be performed. According to some example embodiments, a case where the section is not the shutter section, may refer to a case where the section is the readout section. Thus, overflow of the AFX pixel facing the AF pixel may be prevented.

As above, some example embodiments have been illustrated and described in drawings and descriptions herein. Although some example embodiments have been described using certain terms herein, this is used for the purpose of explaining the technical idea of the present inventive concepts, not to be used to limit the scope of the present inventive concepts described in the claims.

While the inventive concepts have been particularly shown and described with reference to some example embodiments thereof, it will be understood that various changes in form and details may be made therein without departing from the spirit and scope of the following claims.

What is claimed is:

1. An image sensor, comprising:
a pixel array including a plurality of white pixels, a plurality of color pixels, and a plurality of auto focus (AF) pixels; and
a row driver configured to generate signals applied to the pixel array,
wherein each of the plurality of white pixels, the plurality of color pixels, and the plurality of AF pixels of the pixel array comprises a photodiode and a transfer transistor serially connected to the photodiode,
wherein a first shared pixel including some of the plurality of white pixels and the plurality of color pixels comprises a first conversion gain transistor and a second conversion gain transistor each configured to control a conversion gain of the first shared pixel,
wherein a second shared pixel including some of the plurality of white pixels and the plurality of color pixels and at least one AF pixel comprises a third conversion gain transistor and a fourth conversion gain transistor each configured to control a conversion gain of the second shared pixel,
wherein a white pixel control line is connected to a gate of the transfer transistor included in each of the plurality of white pixels,
wherein a color pixel control line is connected to a gate of the transfer transistor included in each of the plurality of color pixels,
wherein an AF pixel control line is connected to a gate of the transfer transistor included in each of the plurality of AF pixels, and
wherein the first conversion gain transistor, the second conversion gain transistor, the third conversion gain transistor, and the fourth conversion gain transistor are connected to different conversion gain control lines, respectively.

2. The image sensor of claim 1, further comprising a timing controller configured to control timings of the signals generated by the row driver, wherein the timing controller is further configured to control a first turn-on timing in a shutter section and a second turn-on timing in a readout section independently on signals applied to the white pixel control line, signals applied to the color pixel control line, and signals applied to the AF pixel control line.

3. The image sensor of claim 2, wherein a length of a first effective integration time (EIT) section that is a section between the first turn-on timing and the second turn-on timing of the signals applied to the white pixel control line is same as a length of a second EIT section that is a section between the first turn-on timing and the second turn-on timing of the signals applied to the color pixel control line.

4. The image sensor of claim 2, wherein a length of a first effective integration time (EIT) section that is a section between the first turn-on timing and the second turn-on timing of the signals applied to the white pixel control line is longer than a length of a second EIT section that is a section between a first turn-on timing and the second turn-on timing of the signals applied to the color pixel control line.

5. The image sensor of claim 2, wherein the timing controller is further configured to control the timings of the signals generated by the row driver to perform first turn-on in the shutter section and not to perform second turn-on in the readout section on signals applied to auto focus X (AFX) pixel control lines connected to the gate of the transfer transistor connected to a sub-pixel facing the AF pixel in a diagonal direction of the second shared pixel.

6. The image sensor of claim 2, wherein the timing controller is further configured to control whether the first conversion gain transistor, the second conversion gain transistor, the third conversion gain transistor, and the fourth conversion gain transistor are turned on during control of the first turn-on timing and the second turn-on timing of the signals applied to the white pixel control line, the signals applied to the color pixel control line, and the signals applied to the AF pixel control line, respectively.

7. The image sensor of claim 6, wherein the timing controller is further configured to control whether the first conversion gain transistor, the second conversion gain transistor, the third conversion gain transistor, and the fourth conversion gain transistor are turned on so that both of the first shared pixel and the second shared pixel operate in a high conversion gain operation mode.

8. The image sensor of claim 6, wherein
the timing controller is further configured to control the first conversion gain transistor to be turned on and the second conversion gain transistor to be turned off so as to control a conversion gain of the first shared pixel at the first turn-on timing and the second turn-on timing of the signals applied to the white pixel control line, the signals applied to the color pixel control line, and the signals applied to the AF pixel control line, respectively,
the timing controller is further configured to control the third conversion gain transistor to be turned on and the fourth conversion gain transistor to be turned off so as to control a conversion gain of the second shared pixel,
the first conversion gain transistor and the third conversion gain transistor are low conversion gain transistors, and
the second conversion gain transistor and the fourth conversion gain transistor are high conversion gain transistors.

9. The image sensor of claim 6, wherein
the timing controller is further configured to control the first conversion gain transistor to be turned on and the second conversion gain transistor to be turned off during control of the first turn-on timing and the second turn-on timing of the signals applied to the white pixel control line,
the timing controller is further configured to control the third conversion gain transistor to be turned on and the fourth conversion gain transistor to be turned off at the first turn-on timing and the second turn-on timing of the signals applied to the AF pixel control line,
the timing controller is further configured to control the first conversion gain transistor to be turned off and the second conversion gain transistor to be turned on at the first turn-on timing and the second turn-on timing of the signals applied to the color pixel control line,
the first conversion gain transistor and the third conversion gain transistor are low conversion gain transistors, and the second conversion gain transistor and the fourth conversion gain transistor are high conversion gain transistors.

10. An image sensor, comprising:
a pixel array including a plurality of white pixels, a plurality of color pixels, and a plurality of auto focus (AF) pixels,
wherein the pixel array includes
a first shared pixel comprising a first two white pixels of the plurality of white pixels and a first two color pixels of the plurality of color pixels,
a second shared pixel comprising a second two white pixels of the plurality of white pixels, a first auto focus X (AFX) pixel, and a first AF pixel, and
a third shared pixel comprising a second two color pixels of the plurality of color pixels, a second AFX pixel, and a second AF pixel,
wherein a gate of a transfer transistor serially connected to a photodiode corresponding to white pixels included in the first shared pixel and the second shared pixel is connected to a white pixel control line, and
wherein a gate of a transfer transistor serially connected to a photodiode corresponding to color pixels included in the first shared pixel and the third shared pixel is connected to a color pixel control line,
wherein a gate of a transfer transistor serially connected to a photodiode corresponding to the first AF pixel and the second AF pixel is connected to an AF pixel control line,
wherein a gate of a transfer transistor serially connected to a photodiode corresponding to the first AFX pixel being a color pixel is connected to a first AFX pixel control line, and
wherein a gate of a transfer transistor serially connected to a photodiode corresponding to the second AFX pixel being a white pixel is connected to a second AFX pixel control line.

11. The image sensor of claim 10, wherein the first shared pixel comprises a first high conversion gain transistor and a first low conversion gain transistor each configured to control a conversion gain of sub-pixels of the first shared pixel, and the second shared pixel comprises a second high conversion gain transistor and a second low conversion gain transistor each configured to control a conversion gain of sub-pixels of the second shared pixel, and the third shared pixel comprises a third high conversion gain transistor and a third low conversion gain transistor each configured to control a conversion gain of sub-pixels of the third shared pixel.

12. The image sensor of claim 11, wherein a gate of the first high conversion gain transistor is connected to a first high conversion gain control line, and a gate of the first low conversion gain transistor is connected to a first low conversion gain control line.

13. The image sensor of claim 12, wherein a gate of the second high conversion gain transistor and a gate of the third high conversion gain transistor are connected to a second high conversion gain control line, and a gate of the second low conversion gain transistor and a gate of the third low conversion gain transistor are connected to a second low conversion gain control line.

14. The image sensor of claim 10, wherein the AF pixel control line comprises:
a first AF pixel control line connected to a gate of the transfer transistor serially connected to a photodiode corresponding to the first AF pixel; and
a second AF pixel control line connected to a gate of the transfer transistor serially connected to a photodiode corresponding to the second AF pixel.

15. An operation method of an image sensor including a plurality of sub-pixels, the plurality of sub-pixels including a plurality of white pixels, a plurality of color pixels, and a plurality of auto focus (AF) pixels, the image sensor further including a timing controller configured to control timings of signals applied to the plurality of sub-pixels, the operation method comprising:
determining, by the timing controller, a first turn-on timing in a shutter section and a second turn-on timing in a readout section of each of signals applied to a white pixel control line connected to the plurality of white pixels, signals applied to a color pixel control line connected to the plurality of color pixels, and signals applied to an AF pixel control line connected to the plurality of AF pixels; and
controlling, by the timing controller, a transition timing from a second level to a first level of signals applied to each of a first high conversion gain control line and a first low conversion gain control line for controlling a conversion gain of a first shared pixel that does not include any AF pixel and signals applied to each of a second high conversion gain control line and a second low conversion gain control line for controlling a conversion gain of a second shared pixel that includes at least one AF pixel.

16. The operation method of claim 15, wherein the determining of the first turn-on timing in the shutter section and the second turn-on timing in the readout section comprises:
first turning-on a white pixel of the first shared pixel;
first turning-on a color pixel of the first shared pixel;
second turning-on a white pixel of the first shared pixel; and
second turning-on a color pixel of the first shared pixel.

17. The operation method of claim 16, wherein a period between the first turn-on and the second turn-on of the white pixel of the first shared pixel is adjusted to be same as or longer than a period between the first turn-on and the second turn-on of the color pixel of the first shared pixel.

18. The operation method of claim 17, further comprising:
transiting signals applied to the first high conversion gain control line from the second level to the first level at the first turn-on and the second turn-on of the white pixel and the first turn-on and the second turn-on of the color pixel; and
transiting signals applied to the second high conversion gain control line from the second level to the first level.

19. The operation method of claim 17, further comprising:
transiting signals applied to the first high conversion gain control line from the second level to the first level at the first turn-on and the second turn-on of the white pixel; and
transiting signals applied to the first low conversion gain control line from the second level to the first level at the first turn-on and the second turn-on of the color pixel.

20. The operation method of claim 15, further comprising:
first turning-on sub-pixels adjacent to an auto focus (AF) pixel of the second shared pixel in a first direction and in a second direction perpendicular to the first direction;
first turning-on sub-pixels arranged in a diagonal direction with respect to the AF pixel of the second shared pixel;
first turning-on the AF pixel of the second shared pixel;

second turning-on sub-pixels adjacent to the AF pixel of
the second shared pixel in the first direction and the
second direction perpendicular to the first direction;
and second turning-on the AF pixel of the second shared pixel.

* * * * *